(12) United States Patent
Jiang

(10) Patent No.: US 9,786,885 B2
(45) Date of Patent: Oct. 10, 2017

(54) BATTERY SEPARATORS COMPRISING INORGANIC PARTICLES

(71) Applicant: Hollingsworth & Vose Company, East Walpole, MA (US)

(72) Inventor: Zhiping Jiang, Westford, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 136 days.

(21) Appl. No.: 14/683,565

(22) Filed: Apr. 10, 2015

(65) Prior Publication Data

US 2016/0301053 A1  Oct. 13, 2016

(51) Int. Cl.
*H01M 2/16* (2006.01)
*H01M 10/06* (2006.01)

(52) U.S. Cl.
CPC ....... *H01M 2/1613* (2013.01); *H01M 2/1646* (2013.01); *H01M 2/162* (2013.01); *H01M 10/06* (2013.01)

(58) Field of Classification Search
None
See application file for complete search history.

(56) References Cited

U.S. PATENT DOCUMENTS

| | | |
|---|---|---|
| 3,930,881 A | 1/1976 | Cestaro et al. |
| 4,137,377 A | 1/1979 | McClelland |
| 4,216,280 A | 8/1980 | Igarashi et al. |
| 4,216,281 A | 8/1980 | O'Rell et al. |
| 4,262,068 A | 4/1981 | Kono et al. |
| 4,336,314 A | 6/1982 | Yonezu et al. |
| 4,391,036 A | 7/1983 | Kishimoto et al. |
| 4,414,295 A | 11/1983 | Uba |
| 4,465,748 A | 8/1984 | Harris |
| 4,529,677 A | 7/1985 | Bodendorf |
| 4,618,401 A | 10/1986 | Bodendorf |
| 4,648,177 A | 3/1987 | Uba et al. |

(Continued)

FOREIGN PATENT DOCUMENTS

| | | |
|---|---|---|
| CN | 1168543 A | 12/1997 |
| CN | 200962440 Y | 10/2007 |

(Continued)

OTHER PUBLICATIONS

U.S. Appl. No. 13/834,597, filed Mar. 15, 2023, Clement et al.

(Continued)

*Primary Examiner* — Wyatt McConnell
(74) *Attorney, Agent, or Firm* — Wolf, Greenfield & Sacks, P.C.

(57) ABSTRACT

Battery separators are generally provided. In some embodiments, the battery separators may comprise a non-woven web including a plurality of inorganic particles (e.g., silica). The non-woven web may include, in some embodiments, a plurality of relatively coarse glass fibers (e.g., having an average diameter of greater than about 1.5 microns), e.g., such that the non-woven web has a particular largest pore size and median pore size. The combination of inorganic particles with a non-woven web having features described herein may exhibit enhanced electrolyte stratification distance and/or reduced electrolyte filling time. In some embodiments, such improvements may be achieved while having relatively minimal or no adverse effects on another property of the battery separator and/or the overall battery.

26 Claims, 9 Drawing Sheets

(56) References Cited

U.S. PATENT DOCUMENTS

| | | |
|---|---|---|
| 5,009,971 A | 4/1991 | Johnson et al. |
| 5,035,966 A | 7/1991 | Tokunaga et al. |
| 5,075,184 A | 12/1991 | Tanaka et al. |
| 5,080,951 A | 1/1992 | Guthrie |
| 5,091,275 A | 2/1992 | Brecht et al. |
| 5,128,218 A | 7/1992 | Tokunaga et al. |
| 5,180,647 A | 1/1993 | Rowland et al. |
| 5,206,100 A | 4/1993 | Muto et al. |
| 5,225,298 A | 7/1993 | Nakayama et al. |
| 5,227,260 A | 7/1993 | Rose et al. |
| 5,281,498 A | 1/1994 | Muto et al. |
| 5,541,013 A | 7/1996 | Shiomi et al. |
| 5,645,956 A | 7/1997 | Degen et al. |
| 5,962,161 A | 10/1999 | Zucker |
| 5,972,500 A | 10/1999 | Gross et al. |
| 5,989,750 A | 11/1999 | Ohba et al. |
| 6,108,879 A | 8/2000 | Forte et al. |
| 6,143,441 A | 11/2000 | Zguris et al. |
| 6,225,005 B1 | 5/2001 | Shiomi et al. |
| 6,254,818 B1 | 7/2001 | Nitsche et al. |
| 6,306,539 B1 | 10/2001 | Zguris |
| 6,319,629 B1 | 11/2001 | De Ferreira |
| 6,406,813 B2 | 6/2002 | Rao |
| 6,495,288 B2 | 12/2002 | Shiomi et al. |
| 6,689,509 B2 | 2/2004 | Zucker |
| 6,703,161 B2 | 3/2004 | Zucker |
| 6,706,450 B2 | 3/2004 | Asada |
| 6,869,726 B2 | 3/2005 | Zucker |
| 6,939,645 B2 | 9/2005 | Sugiyama et al. |
| 7,097,939 B2 | 8/2006 | Ferreira et al. |
| 7,288,338 B2 | 10/2007 | Zguris |
| 7,481,076 B2 | 1/2009 | Windisch et al. |
| 7,682,738 B2 | 3/2010 | Ferreira et al. |
| 8,071,239 B2 | 12/2011 | Sugie et al. |
| 8,197,967 B2 | 6/2012 | Sugie et al. |
| 8,221,920 B2 | 7/2012 | Kawachi et al. |
| 8,404,378 B2 | 3/2013 | Whear et al. |
| 8,592,089 B2 | 11/2013 | La |
| 8,592,329 B2 | 11/2013 | Coon et al. |
| 8,722,231 B2 | 5/2014 | Brilmyer et al. |
| 9,293,748 B1 | 3/2016 | Ashirgade et al. |
| 9,577,236 B2 | 2/2017 | Ashirgade et al. |
| 9,627,668 B1 | 4/2017 | Ashirgade et al. |
| 2002/0142226 A1 | 10/2002 | Zguris et al. |
| 2003/0008214 A1 | 1/2003 | Zguris |
| 2003/0022068 A1 | 1/2003 | Pekala |
| 2003/0054232 A1 | 3/2003 | Zucker |
| 2003/0054233 A1 | 3/2003 | Zucker |
| 2003/0054234 A1 | 3/2003 | Zucker |
| 2003/0054237 A1 | 3/2003 | Zucker |
| 2005/0084762 A1 | 4/2005 | Vaccaro et al. |
| 2006/0068294 A1 | 3/2006 | Mraz et al. |
| 2008/0241662 A1 | 10/2008 | Kawachi et al. |
| 2008/0299462 A1 | 12/2008 | Whear et al. |
| 2011/0091761 A1 | 4/2011 | Miller et al. |
| 2011/0143184 A1 | 6/2011 | McCarthy et al. |
| 2011/0147320 A1 | 6/2011 | Sealey et al. |
| 2011/0217583 A1 | 9/2011 | Sugiyama et al. |
| 2011/0229750 A1 | 9/2011 | McLellan et al. |
| 2012/0070713 A1 | 3/2012 | Whear et al. |
| 2012/0070727 A1 | 3/2012 | Wertz et al. |
| 2012/0070728 A1 | 3/2012 | Wertz et al. |
| 2012/0070729 A1 | 3/2012 | Wertz et al. |
| 2012/0070747 A1 | 3/2012 | Whear et al. |
| 2012/0183862 A1 | 7/2012 | Gupta et al. |
| 2012/0318754 A1 | 12/2012 | Cox et al. |
| 2013/0071723 A1 | 3/2013 | Wertz et al. |
| 2013/0071734 A1 | 3/2013 | Wertz et al. |
| 2013/0071735 A1 | 3/2013 | Wertz et al. |
| 2013/0101887 A1 | 4/2013 | Sugiyama et al. |
| 2013/0224632 A1 | 8/2013 | Roumi |
| 2013/0273409 A1 | 10/2013 | Nandi et al. |
| 2014/0038023 A1 | 2/2014 | Guo et al. |
| 2014/0087218 A1 | 3/2014 | Saito |
| 2014/0217583 A1 | 8/2014 | Yuzawa et al. |
| 2014/0227585 A1 | 8/2014 | Wertz et al. |
| 2014/0272535 A1 | 9/2014 | Clement et al. |
| 2016/0079581 A1 | 3/2016 | Ashirgade et al. |
| 2016/0149183 A1 | 5/2016 | Keisler et al. |
| 2016/0164058 A1 | 6/2016 | Ashirgade et al. |
| 2017/0092917 A1 | 3/2017 | Ashirgade et al. |

FOREIGN PATENT DOCUMENTS

| | | |
|---|---|---|
| CN | 201194241 Y | 2/2009 |
| CN | 201450040 U | 5/2010 |
| EP | 0 226 876 A1 | 7/1987 |
| EP | 0 109 282 B1 | 9/1988 |
| EP | 0 466 302 A1 | 1/1992 |
| EP | 0 613 201 A1 | 8/1994 |
| EP | 0 680 105 A1 | 11/1995 |
| EP | 0 947 011 B1 | 12/2001 |
| EP | 1 585 182 A1 | 10/2005 |
| EP | 1 617 495 A1 | 1/2006 |
| EP | 0 949 705 B1 | 11/2006 |
| EP | 1 170 809 B1 | 7/2007 |
| EP | 1 444 742 B1 | 5/2011 |
| EP | 2 235 767 B1 | 8/2011 |
| EP | 2 352 187 A1 | 8/2011 |
| EP | 2 571 079 A1 | 3/2013 |
| EP | 2 571 091 A1 | 3/2013 |
| EP | 2 709 200 A1 | 3/2014 |
| JP | S59-16263 A | 1/1984 |
| JP | S63-143742 A | 6/1988 |
| JP | S63-146348 A | 6/1988 |
| JP | H03-8258 A | 1/1991 |
| JP | H04-32158 A | 2/1992 |
| JP | H06-295718 A | 10/1994 |
| JP | H07-176300 A | 7/1995 |
| JP | H07-201310 A | 8/1995 |
| JP | H09-92252 A | 4/1997 |
| JP | 2005-310426 A | 11/2005 |
| KR | 820001508 B1 | 8/1982 |
| WO | WO 98/12759 A1 | 3/1998 |
| WO | WO 98/52240 A1 | 11/1998 |
| WO | WO 03/026037 A2 | 3/2003 |
| WO | WO 2008/067155 A2 | 6/2008 |
| WO | WO 2009/102946 A1 | 8/2009 |
| WO | WO 2010/127056 A1 | 11/2010 |
| WO | WO 2011/142096 A1 | 11/2011 |
| WO | WO 2012/040395 A2 | 3/2012 |
| WO | WO 2012/054667 A1 | 4/2012 |
| WO | WO 2014/149703 A1 | 9/2014 |

OTHER PUBLICATIONS

U.S. Appl. No. 13/239,273, filed Sep. 21, 2011, Wertz et al.
U.S. Appl. No. 15/018,931, filed Feb. 9, 2016, Ashirgade et al.
U.S. Appl. No. 14/550,413, filed Nov. 21, 2014, Keisler et al.
International Search Report and Written Opinion for PCT/US2016/026322 dated Jul. 1, 2016.
U.S. Appl. No. 15/510,339, filed Mar. 10, 2017, Natesh.
U.S. Appl. No. 15/127,057, filed Sep. 19, 2016, Natesh.
U.S. Appl. No. 15/427,208, filed Feb. 8, 2017, Ashirgade et al.
U.S. Appl. No. 15/359,902, filed Nov. 23, 2016, Clement et al.
U.S. Appl. No. 15/380,990, filed Dec. 15, 2016, Wertz et al.
International Search Report and Written Opinion for PCT/US2014/020484 dated Jun. 23, 2014.
International Preliminary Report on Patentability for PCT/US2014/020484 dated Sep. 24, 2015.
International Search Report and Written Opinion for PCT/US2015/049929 dated Dec. 4, 2015.
McGregor et al., Essential characteristics for separators in valve-regulated lead-acid batteries. Journal of Power Sources. 2002;111:288-303.
Turbak, Nonwovens: Theory, Process, Performance, and Testing. Tappi Press 1993. Excerpt pp. 144-147.
Zguris et al., Nonwovens Battery Separators to improve performance in lead acid battery systems. Mabat Conference. Warsaw, Poland. Jul. 24, 1991.

BATTERY SEPARATORS COMPRISING INORGANIC PARTICLES

FIELD OF INVENTION

The present embodiments relate generally to non-woven webs, and specifically, to non-woven webs that can be used as battery separators for batteries, such as lead acid batteries.

BACKGROUND

Batteries convert stored chemical energy into electrical energy and are commonly used as energy sources. Typically, a battery comprises one or more electrochemical cells including a negative electrode, a positive electrode, an electrolyte, and a battery separator. A battery separator is a critical component in many batteries. The battery separator mechanically and electrically isolates the negative and positive electrodes, while also allowing ions in the electrolyte to move between the electrodes.

Battery separators should be chemically, mechanically, and electrochemically stable under the strongly reactive environments in the battery during operation, should not adversely interact with the electrolyte and/or electrode materials, and have no deleterious effect on the battery's performance (e.g., energy production, cycle life, safety). For example, the battery separator should not degrade, leach harmful components, react in a negative way with the electrode materials, allow short circuits to form between the electrodes, and/or crack or break during battery assembly and/or operation. Batteries separators also play a role in determining the assembly speed of the battery, as well as the performance during service. For example, during assembly, acid electrolyte may be filled into the battery containers and the structure of the separator can impact the speed of the filling and distribution of the electrolyte within the battery (e.g., stratification). Though many battery separators exist, improvements in the retention of electrolyte, and/or improvements in formation of the battery, would be beneficial.

SUMMARY

The present embodiments relate generally to non-woven webs, and specifically, to non-woven webs that can be used as battery separators for batteries, such as lead acid batteries.

In one set of embodiments, a series of battery separators are provided. In one embodiment, a battery separator comprises a non-woven web comprising: a plurality of glass fibers having an average diameter of greater than or equal to about 1.5 microns, wherein the glass fibers are present in an amount of greater than or equal to about 50 wt % of the non-woven web; and a plurality of inorganic particles, wherein the non-woven web has a largest pore size of at least about 8 microns and less than or equal to about 25 microns, and wherein the non-woven web has a median pore size of at least about 2.5 microns and less than or equal to about 6 microns.

In another embodiment, a battery separator comprises a non-woven web comprising a plurality of glass fibers having an average diameter of greater than or equal to about 1.5 microns, wherein the glass fibers are present in an amount of greater than or equal to about 50 wt % of the non-woven web; a plurality of inorganic particles; wherein the non-woven web has an acid stratification distance of less than or equal to about 5 cm; and wherein the non-woven web has an acid filling time of less than or equal to about 200 seconds.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figure, which is schematic and is not intended to be drawn to scale. In the figure, each identical or nearly identical component illustrated is typically represented by a single numeral. For purposes of clarity, not every component is labeled, nor is every component of each embodiment of the invention shown where illustration is not necessary to allow those of ordinary skill in the art to understand the invention. In the figures.

DETAILED DESCRIPTION

Figure 1:
FIG. 1 is a schematic diagram of a battery separator including a non-woven web according to one set of embodiments.

Battery separators are provided. In some embodiments, the battery separators described herein may comprise a non-woven web including a plurality of inorganic particles (e.g., silica). The non-woven web may include, in some embodiments, a plurality of relatively coarse glass fibers (e.g., having an average diameter of greater than about 1.5 microns), e.g., such that the non-woven web has a particular largest pore size and/or median pore size. The combination of inorganic particles with a non-woven web having features described herein may exhibit reduced electrolyte stratification and/or reduced electrolyte filling time. In some embodiments, such improvements may be achieved while having relatively minimal or no adverse effects on another property of the battery separator and/or the overall battery. The battery separators described herein may be well suited for a variety of battery types, including lead acid batteries.

In a typical battery, the battery separator primarily functions to electrically and mechanically isolate the negative electrode and positive electrode, while allowing ionic conduction. However, the presence of the battery separator between the electrodes can affect battery performance (e.g., electrical resistance). For instance, the battery separator generally increases the resistance to ion movement between the electrodes compared to the electrolyte alone and thus increases the electrical resistance of the battery. Moreover, the battery separator can reduce the amount of electrolyte between the electrodes compared to the electrolyte alone for a given volume between the electrodes), due to the volume occupied by the battery separator. This reduction of electrolyte can limit the battery capacity. In general, the chemical (e.g., composition, stability, wettability), structural (e.g., porosity, pore size, thickness, permeability), and/or mechanical (e.g., strength, stiffness) properties of the battery separator can affect battery performance (e.g. electrical resistance, capacity).

The manufacturing process for forming batteries such as lead acid batteries generally includes an acid electrolyte filling step. The pore structure of the separator can impact the speed of the acid filling and/or the performance of the resulting battery. It is generally desirable to have a separator capable of allowing quick diffusion of the acid electrolyte into the separator and which permits contact of the electrolyte with the electrodes (e.g., having a separator with relatively large pore sizes). It is also desirable to have fast battery assembly speeds and to avoid defects within the battery (e.g., from hydro shorts caused by uneven distribution of acid within the battery and/or separator). However, when the lead acid batteries are cycling, the sulfuric acid ($H_2SO_4$) molecules tend to accumulate at the bottom of the separator, resulting in an uneven distribution of electrolyte (e.g., acid electrolyte) concentration across the separator, also known as acid stratification. Acid stratification generally results in corrosion and/or degraded battery performance, and reduces the life of the battery. Accordingly, there is a need for improved battery separators which address the balance between acid stratification and acid filling time.

As noted above, in some embodiments, a battery separator including a non-woven web described herein may have a relatively fast electrolyte (e.g., acid) filling time and a relatively low electrolyte (e.g., acid) stratification distance (a measure of the distance which an acid electrolyte displaces a low density acid in a separator within 60 minutes, as described in more detail below). The relative fast filling time and/or relative low stratification distance may be influenced by, at least in part, the surface area of the inorganic particles (e.g., enabling enhanced absorption of an acid) and/or the pore sizes (e.g., largest pore size, median pore size) of the separator. Generally, all other factors being equal, a relatively low acid stratification distance is associated with smaller pores while a relatively fast acid filling time is associated with larger pores. Such a combination of desirable properties is generally difficult to achieve in a single separator. As described herein, in some embodiments, the incorporation of inorganic particles may enable enhanced acid absorption, resulting in a relatively low acid stratification distance, while the pore size (e.g., largest pore size, median pore size) of the battery separator may be tuned to achieve a relatively fast acid filling time.

A non-limiting example of a battery separator including a non-woven web is shown schematically in FIG. 1. In some embodiments, a battery separator 5 may include a non-woven web 6. In some embodiments, a non-woven web 6 includes a plurality of glass fibers. The non-woven web may also include a plurality inorganic particles, such as silica particles. In some embodiments, the battery separator may be a single layer (e.g., the separator does not include layer 7 FIG. 1). For instance, the battery separator may be formed of a single non-woven web.

In other embodiments, the battery separator may comprise multiple layers. For instance, in addition to non-woven web 6, the battery separator may include an optional layer 7 (e.g., additional layer), which may be adjacent the non-woven web (e.g., contacting one sides of the non-woven web). The multi-layer battery separator may include at least one non-woven web (e.g., at least two non-woven webs, at least three non-woven webs), with at least one non-woven including a plurality of inorganic particles, as described herein.

In some embodiments, one or more optional layers (e.g., additional layers) may be a non-woven web. Non-limiting examples of optional/additional layers include fibrous webs such as non-woven webs comprising a plurality of glass fibers, which may also include a plurality of inorganic particles in some embodiments, but in other embodiments, may be substantially free of inorganic particles. Other types of layers are also possible.

As used herein, when a layer is referred to as being "adjacent" another layer, it can be directly adjacent to the layer, or an intervening layer also may be present. A layer that is "directly adjacent" another layer means that no intervening layer is present.

It should be understood that the configurations of the layers shown in the figures are by way of example only, and that in other embodiments, battery separators including other configurations of layers may be possible. Furthermore, in some embodiments, additional layers may be present in addition to the ones shown in the figures. It should also be appreciated that not all components shown in the figures need be present in some embodiments.

Figure 2:
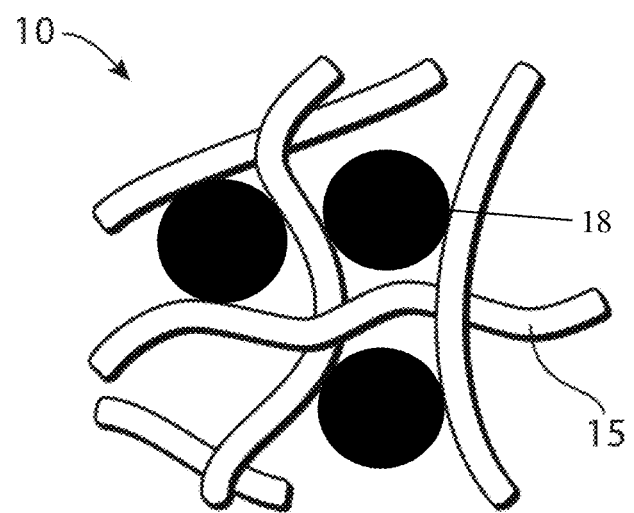
FIG. 2 is a schematic diagram showing a cross section of a non-woven web including a plurality of fibers and a plurality of inorganic particles according to one set of embodiments.

Non-limiting examples of a non-woven web including inorganic particles is shown in FIGS. 2A-2C. Examples of inorganic particles are provided below. As shown illustratively in FIG. 2A, a non-woven web 10, shown in cross-section, may include a plurality of fibers 15 (e.g., glass fibers, glass fibers and synthetic fibers). In some instances, non-woven web 10 may also comprise a plurality of inorganic particles 18 (e.g., sulfuric acid-resistant inorganic particles).

As described herein, in some embodiments, the non-woven web may comprise inorganic particles. In some embodiments, inorganic particles in the non-woven web may result in an increase in the surface area of the non-woven web without significantly altering the volume porosity of the non-woven web. The resulting non-woven web may have improved wettability to electrolyte and may absorb more electrolyte compared to a similar non-woven web that lacks inorganic particles (all other factors being equal). Consequently, a non-woven web including inorganic particles may have a reduced acid stratification distance compared to a similar non-woven web that lacks inorganic particles (all other factors being equal). In some embodiments, the inorganic particles may serve to reduce the pore size and/or the variation in pore size of the non-woven web.

Non-limiting examples of inorganic particles include silica (e.g., fumed, precipitated, colloid), clay, talc, diatoms (e.g., diatomaceous earth), zeolites, and combinations thereof. In certain embodiments, the inorganic particles (e.g., silica) are ground, fused, and/or agglomerated. In some embodiments, the inorganic particles are substantially nonporous. However, the inorganic particles may be porous in some instances. For certain battery types, a suitable inorganic particle may be resistant to sulfuric acid and/or may have a suitable surface area, as described in more detail below. Additionally, the inorganic particles may be chemically inert and thermally stable.

In some embodiments, the weight percentage of inorganic particles in the non-woven web and/or battery separator may be greater than or equal to about 3 wt. %, greater than or equal to about 5 wt. %, greater than or equal to about 7 wt. %, greater than or equal to about 10 wt. %, greater than or equal to about 15 wt. %, greater than or equal to about 20 wt. %, or greater than or equal to about 25 wt. %. In some cases, the weight percentage of inorganic particles in the non-woven web and/or battery separator may be less than or equal to about 30 wt. %, less than or equal to about 25 wt. %, less than or equal to about 20 wt. %, less than or equal to about 15 wt. %, less than or equal to about 10 wt. %, less than or equal to about 7 wt. %, or less than or equal to about 5 wt. %. Combinations of the above-referenced ranges are also possible (e.g., greater than or equal to about 3 wt. % and less than about 30 wt. %, greater than or equal to about 5 wt. % and less than about 15 wt. %). Other ranges are also possible. The weight percentage of inorganic particles in the entire non-woven web and/or battery separator is based on the dry solids and can be determined prior to forming the non-woven web.

In some embodiments, the inorganic particles (e.g., silica) may have a relatively high surface area. In certain embodiments, inorganic particles with a high surface area may resist stratification, or layering of acid, which may occur during charge of the battery.

In some embodiments, the inorganic particles included in a non-woven web and/or separator described herein may be chosen to have a particular range of average surface area. The average surface area of the inorganic particles may be, for example, greater than or equal to about 100 $m^2/g$, greater than or equal to about 200 $m^2/g$, greater than or equal to about 300 $m^2/g$, greater than or equal to about 400 $m^2/g$, greater than or equal to about 500 $m^2/g$, greater than or equal to about 600 $m^2/g$, greater than or equal to about 700 $m^2/g$, greater than or equal to about 750 $m^2/g$, or greater than or equal to about 800 $m^2/g$. In some embodiments, the average surface area of the inorganic particles may be less than or equal to about 850 $m^2/g$, less than or equal to about 750 $m^2/g$, less than or equal to about 700 $m^2/g$, less than or equal to about 600 $m^2/g$, less than or equal to about 500 $m^2/g$, less than or equal to about 400 $m^2/g$, less than or equal to about 300 $m^2/g$, or less than or equal to about 200 $m^2/g$. Combinations of the above-referenced ranges are also possible (e.g., greater than or equal to about 100 $m^2/g$ and less than or equal to about 850 $m^2/g$, greater than or equal to about 300 $m^2/g$ and less than or equal to about 750 $m^2/g$, greater than or equal to about 200 $m^2/g$ and less than or equal to about 600 $m^2/g$, greater than or equal to about 400 $m^2/g$ and less than or equal to about 700 $m^2/g$). Other ranges are also possible. As determined herein, surface area is measured according to BCIS-03A, September 2009 revision, Method 8 (e.g., using a 0.5 gram sample).

In some embodiments, the average particle size (e.g., average diameter, or average largest cross-sectional dimension) of the inorganic particles included in a non-woven web and/or separator described herein may be, for example, greater than about 0.01 microns, greater than or equal to about 0.05 microns, greater than or equal to about 0.1 microns, greater than or equal to about 0.5 microns, greater than or equal to about 1 micron, greater than or equal to about 2 microns, greater than or equal to about 4 microns, greater than or equal to about 6 microns, greater than or equal to about 8 microns, greater than or equal to about 10 microns, greater than or equal to about 12 microns, greater than or equal to about 14 microns, greater than or equal to about 16 microns, or greater than or equal to about 18 microns. The particles may have an average particle size of, for example, less than or equal to about 20 microns, less than or equal to about 18 microns, less than or equal to about 16 microns, less than or equal to about 14 microns, less than or equal to about 12 microns, less than or equal to about 10 microns, less than or equal to about 8 microns, less than or equal to about 6 microns, less than or equal to about 4 microns, less than or equal to about 2 microns, less than or equal to about 1 micron, less than or equal to about 0.5 microns, less than or equal to about 0.1 microns, or less than or equal to about 0.05 microns. Combinations of the above-referenced ranges are also possible (e.g., greater than or equal to about 0.05 microns and less than or equal to about 20 microns, greater than or equal to about 1 micron and less than or equal to about 18 microns). Other ranges are also possible. Those skilled in the art would be capable of selecting suitable methods for determining average particle size including, for example, laser diffraction. For example, in a laser diffraction method, particles are passed through a laser beam (e.g., an He—Ne laser beam) and the scattering of the laser light is measured, where the particle size is directly proportional to the intensity of light scatted and inversely proportional to the angle of the laser beam.

In some embodiments, the inorganic particles included in a nonwoven web and/or battery separator may be resistant to sulfuric acid. As used herein, particles that are resistant to sulfuric acid refer to inorganic particles that have an acid weight loss of less than 20% (e.g., less than 15%, less than 10%, less than 5%) of the total weight of the particles after a three-hour reflux in 1.260 SG sulfuric acid using the BCIS-03A March 2010 method 13. The weight of the inorganic particles is measured prior to and after such sulfuric acid exposure to determine percent of weight lost (e.g., % acid weight loss=[weight of particles before exposure−weight of particles after exposure]/weight of particles before exposure*100). In some embodiments, inorganic particles having a total weight loss of less than 20%, less than 15%, less than 10%, or less than 5% are used in a non-woven web and/or battery separator described herein.

In general, any suitable process may be used to add the inorganic particles to the non-woven web and/or battery separator. In some embodiments, the inorganic particles are added with the fibers in the fiber slurry (e.g., forming a wet stock which may be subsequently dried) during formation of the non-woven web.

In some embodiments, a non-woven web may include glass fibers (e.g., microglass fibers, chopped strand glass fibers, or a combination thereof). Microglass fibers and chopped strand glass fibers are known to those of ordinary skill in the art. One of ordinary skill in the art is able to determine whether a glass fiber is microglass or chopped strand by observation (e.g., optical microscopy, electron microscopy). Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Microglass fibers are drawn from bushing tips and further subjected to flame blowing or rotary spinning processes. In some cases, fine microglass fibers may be made using a remelting process. In this respect, microglass fibers may be fine or coarse. As used herein, fine microglass fibers are less than or equal to 1 micron in diameter and coarse microglass fibers are greater than or equal to 1 micron in diameter.

The microglass fibers may have small diameters. For instance, in some embodiments, the average diameter of the microglass fibers may be less than or equal to about 10 microns, less than or equal to about 9 microns, less than or equal to about 7 microns, less than or equal to about 5 microns, less than or equal to about 3 microns, or less than or equal to about 1 micron. In some instances, the microglass fibers may have an average fiber diameter of greater than or equal to about 0.1 microns, greater than or equal to about 0.3 microns, greater than or equal to about 1 micron, greater than or equal to about 3 microns, or greater than or equal to about 7 microns. Combinations of the above-referenced ranges are also possible (e.g., greater than or equal to about 0.1 microns and less than or equal to about 10 microns, greater than or equal to about 0.1 microns and less than or equal to about 5 microns, greater than or equal to about 0.3 microns and less than or equal to about 3 microns). Other values of average fiber diameter are also possible. Average diameter distributions for microglass fibers are generally log-normal. However, it can be appreciated that microglass fibers may be provided in any other appropriate average diameter distribution (e.g., Gaussian distribution).

In some embodiments, the average length of microglass fibers may be less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of microglass fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., microglass fibers having an average length of greater than or equal to about 4 mm and less than about 6 mm). Other ranges are also possible.

In general, chopped strand glass fibers may have an average fiber diameter that is greater than the diameter of the microglass fibers. For instance, in some embodiments, the average diameter of the chopped strand glass fibers may be greater than or equal to about 5 microns, greater than or equal to about 7 microns, greater than or equal to about 9 microns, greater than or equal to about 11 microns, or greater than or equal to about 20 microns. In some instances, the chopped strand glass fibers may have an average fiber diameter of less than or equal to about 30 microns, less than or equal to about 25 microns, less than or equal to about 15 microns, less than or equal to about 12 microns, less than or equal to about 10 microns. Combinations of the above-referenced ranges are also possible (e.g., greater than or equal to about 5 microns and less than or equal to about 12 microns). Other values of average fiber diameter are also possible. Chopped strand diameters tend to follow a normal distribution. Though, it can be appreciated that chopped strand glass fibers may be provided in any appropriate average diameter distribution (e.g., Gaussian distribution).

In some embodiments, chopped strand glass fibers may have a length in the range of between about 3 mm and about 25 mm (e.g., about 6 mm, or about 12 mm). In some embodiments, the average length of chopped strand glass fibers may be less than or equal to about 25 mm, less than or equal to about 20 mm, less than or equal to about 15 mm, less than or equal to about 12 mm, less than or equal to about 10 mm, less than or equal to about 7 mm, or less than or equal to about 5 mm. In certain embodiments, the average length of chopped strand glass fibers may be greater than or equal to about 3 mm, greater than or equal to about 5 mm, greater than or equal to about 10 mm, greater than or equal to about 12 mm, greater than equal to about 15 mm, or greater than or equal to about 20 mm. Combinations of the above referenced ranges are also possible (e.g., chopped strand glass fibers having an average length of greater than or equal to about 3 mm and less than about 25 mm). Other ranges are also possible.

It should be appreciated that the above-noted dimensions are not limiting and that the microglass and/or chopped strand fibers, as well as the other fibers described herein, may also have other dimensions.

In some embodiments, the average diameter of the glass fibers (e.g., regardless of whether the glass fibers are microglass, chopped strand, or another type) in the non-woven web may be greater than or equal to about 1.5 microns, greater than or equal to about 2 microns, greater than or equal to about 2.5 microns, greater than or equal to about 3 microns, greater than or equal to about 4.5 microns, greater than or equal to about 5 microns, greater than or equal to about 6 microns, greater than or equal to about 7 microns, or greater than or equal to about 9 microns. In some instances, the average diameter of the glass fibers in the non-woven web may have an average fiber diameter of less than or equal to about 10 microns, less than or equal to about 9 microns, less than or equal to about 7 microns, less than or equal to about 6 microns, less than or equal to about 5 microns, less than or equal to about 4.5 microns, less than or equal to about 3 microns, less than or equal to about 2.5 microns, or less than or equal to about 2 microns. Combinations of the above-referenced ranges are also possible (e.g., greater than or equal to about 1.5 microns and less than or equal to about 10 microns, greater than or equal to about 2 microns and less than or equal to about 9 microns, greater than or equal to about 2 microns and less than or equal to about 5 microns, greater than or equal to about 2.5 microns and less than or equal to about 4.5 microns).

In some embodiments, the average length of the glass fibers in the non-woven web (e.g., regardless of whether the glass fibers are microglass, chopped strand, or another type) may be less than or equal to about 25 mm, less than or equal to about 20 mm, less than or equal to about 15 mm, less than or equal to about 12 mm, less than or equal to about 10 mm, less than or equal to about 8 mm, less than or equal to about 5 mm, less than or equal to about 3 mm, or less than or equal to about 1 mm. In certain embodiments, the average length of the glass fibers in the non-woven web may be greater than or equal to about 0.05 mm, greater than or equal to about 0.1 mm, greater than or equal to about 0.3 mm, greater than or equal to about 0.5 mm, greater than equal to about 1 mm, greater than or equal to about 5 mm, greater than equal to about 10 mm, greater than or equal to about 15 mm, or greater than equal to about 20 mm. Combinations of the above referenced ranges are also possible (e.g., greater than or equal to about 1 mm and less than about 25 mm, greater than or equal to about 0.3 mm and less than about 20 mm, greater than or equal to about 0.1 mm and less than about 12 mm, greater than or equal to about 0.2 mm and less than about 6 mm, greater than or equal to about 0.5 mm and less than about 3 mm). Other ranges are also possible.

A non-woven web may include a suitable percentage of glass fibers (e.g., regardless of whether the glass fibers are microglass, chopped strand, or another type). In some embodiments, the weight percentage of glass fibers in the non-woven web may be greater than or equal to about 50 wt. %, greater than or equal to about 60 wt. %, greater than or equal to about 70 wt. %, greater than or equal to about 80 wt. %, greater than or equal to about 90 wt. %, or greater than or equal to about 95 wt. %. In some embodiments, the weight percentage of the glass fibers in the non-woven web may be less than or equal to about 97 wt. %, less than or equal to about 95 wt. %, less than or equal to about 90 wt. %, less than or equal to about 80 wt. %, less than or equal to about 70 wt. %, or less than or equal to about 60 wt. %. Combinations of the above-referenced ranges are also possible (e.g., greater than about 50 wt. % and less than or equal to about 97 wt. %, greater than about 60 wt. % and less than or equal to about 97 wt. %, greater than about 70 wt. % and less than or equal to about 97 wt. %). Other ranges are also possible. In some embodiments, a non-woven web includes the above-noted ranges of glass fibers with respect to the total weight of fibers in the non-woven web and/or the battery separator.

In some embodiments, the non-woven web comprises between about 0 wt. % and about 30 wt. % chopped strand glass fibers and the remainder comprising microglass fibers. For example, in some embodiments, the non-woven web comprises greater than or equal to about 0 wt. %, greater than or equal to about 5 wt. %, greater than or equal to about 10 wt. %, greater than or equal to about 15 wt. %, greater than or equal to about 20 wt. %, or greater than or equal to about 25 wt. % chopped strand glass fibers and the remainder comprising microglass fibers. In certain embodiments, the non-woven web comprises less than or equal to about 30 wt. %, less than or equal to about 25 wt. %, less than or equal to about 20 wt. %, less than or equal to about 15 wt. %, less than or equal to about 10 wt. %, or less than or equal to about 5 wt. % chopped strand glass fibers and the remainder comprising microglass fibers. Combinations of the above-referenced ranges are also possible (e.g., greater than about 0 wt. % and less than or equal to about 30 wt. % chopped strand glass fibers, greater than about 5 wt. % and less than or equal to about 10 wt. % chopped strand glass fibers). Other ranges are also possible. In some embodiments, a non-woven web includes the above-noted ranges of chopped strand glass fibers with respect to the total weight of fibers in the non-woven web and/or the battery separator.

In some embodiments, a non-woven web described herein includes one or more synthetic fibers. Synthetic fibers may include any suitable type of synthetic polymer. Examples of suitable synthetic fibers include polyester (e.g., polyethylene terephthalate), polyaramid, polyimide, polyolefin (e.g., polyethylene), polypropylene, Kevlar, nomex, halogenated polymers, acrylics, polyphenylene oxide, polyphenylene sulfide, and combinations thereof. In some embodiments, the synthetic fibers are organic polymer fibers. Synthetic fibers may also include multi-component fibers (i.e., fibers having multiple compositions such as bi-component fibers). The non-woven web may also include combinations of more than one type of composition of synthetic fiber. It should be understood that other compositions of synthetic fiber types may also be used.

In some embodiments, synthetic fibers may be binder fibers, as described in more detail below.

Non-woven webs including combinations of different types of synthetic fibers are also possible.

A non-woven web may include a suitable percentage of synthetic fibers. In some embodiments, the weight percentage of synthetic fibers in the non-woven web may be 0%, greater than or equal to about 1 wt. %, greater than or equal to about 4 wt. %, greater than or equal to about 5 wt. %, greater than or equal to about 10 wt. %, or greater than or equal to about 15 wt. %. In some embodiments, the weight percentage of the synthetic fibers in the non-woven web may be less than or equal to about 20 wt. %, less than or equal to about 10 wt. %, less than or equal to about 5 wt. %, or less than or equal to about 4 wt. %. Combinations of the above-referenced ranges are also possible (e.g., greater than about 0 wt. % and less than or equal to about 20 wt. %, greater than about 1 wt. % and less than or equal to about 20 wt. %, greater than about 4 wt. % and less than or equal to about 15 wt. %). Other ranges are also possible. In some embodiments, a non-woven web includes the above-noted ranges of synthetic fibers with respect to the total weight of fibers in the non-woven web and/or the battery separator.

In general, synthetic fibers may have any suitable dimensions. For instance, in some embodiments, the synthetic fibers may have an average diameter of greater than or equal to about 0.5 micron, greater than or equal to about 1 micron, greater than or equal to about 2 microns, greater than or equal to about 4 microns, greater than or equal to about 6 microns, greater than or equal to about 8 microns, greater than or equal to about 10 microns, greater than or equal to about 12 microns, greater than or equal to about 15 microns, greater than or equal to about 20 microns, greater than or equal to about 30 microns, or greater than or equal to about 40 microns. In some cases, the synthetic fibers may have an average diameter of less than or equal to about 50 microns, less than or equal to about 40 microns, less than or equal to about 30 microns, less than or equal to about 20 microns, less than or equal to about 15 microns, less than or equal to about 12 microns, less than or equal to about 10 microns, than or equal to about 8 microns, less than or equal to about 6 microns, less than equal to about 4 microns, or less than or equal to about 2 microns. Combinations of the above referenced ranges are also possible (e.g., greater than or equal to about 0.5 microns and less than about 50 microns, greater than or equal to about 2 microns and less than about 20 microns). Other ranges are also possible.

In some embodiments, synthetic fibers may have an average length of greater than or equal to about 0.25 mm, greater than or equal to about 0.5 mm, greater than or equal to about 1 mm, greater than or equal to about 3 mm, greater than or equal to about 5 mm, greater than or equal to about 10 mm, greater than or equal to about 25 mm, or greater than or equal to about 50 mm. In some instances, synthetic fibers may have an average length of less than or equal to about 50 mm, less than or equal to about 25 mm, less than or equal to about 20 mm, less than or equal to about 15 mm, less than or equal to about 12 mm, less than or equal to about 10 mm, less than or equal to about 9 mm, less than or equal to about 6 mm, less than or equal to about 4 mm, less than or equal to about 2 mm, or less than or equal to about 1 mm. Combinations of the above-referenced ranges are also possible (e.g., greater than or equal to about 1 mm and less than or equal to about 12 mm, greater than or equal to about 3 mm and less than or equal to about 15 mm). Other values of average fiber length are also possible.

As described herein, in some embodiments, at least a portion of the synthetic fibers may be binder fibers. The binder fibers may be mono-component (i.e., having a single composition) or multi-component (i.e., having multiple compositions such as a bi-component fiber). The non-woven web may include a suitable percentage of mono-component fibers and/or multi-component fibers. In some embodiments, all of the synthetic fibers are mono-component fibers. In some embodiments, at least a portion of the synthetic fibers are multi-component fibers. In some embodiments, the non-woven web may comprise a residue from a binder fiber.

An example of a multi-component fiber is a bi-component fiber which includes a first material and a second material that is different from the first material. The different components of a multi-component fiber may exhibit a variety of spatial arrangements. For example, multi-component fibers may be arranged in a core-sheath configuration (e.g., a first material may be a sheath material that surrounds a second material which is a core material), a side by side configuration (e.g., a first material may be arranged adjacent to a second material), a segmented pie arrangement (e.g., different materials may be arranged adjacent to one another in a wedged configuration), a tri-lobal arrangement (e.g., a tip of a lobe may have a material different from the lobe) and an arrangement of localized regions of one component in a different component (e.g., "islands in sea").

In some embodiments, for a core-sheath configuration, a multi-component fiber, such as a bi-component fiber, may include a sheath of a first material that surrounds a core comprising a second material. In such an arrangement, for some embodiments, the melting point of the first material may be lower than the melting point of the second material. Accordingly, at a suitable step during manufacture of a non-woven web (e.g., drying), the first material comprising the sheath may be melted (e.g., may exhibit a phase change) while the second material comprising the core remains unaltered (e.g., may exhibit no phase change). For instance, an outer sheath portion of a multi-component fiber may have a melting temperature between about 50° C. and about 200° C. (e.g., 180° C.) and an inner core of the multi-component fiber may have a melting temperature above 200° C. As a result, when the fiber is subjected to a temperature during drying, e.g., at 180° C., then the outer sheath of the fiber may melt while the core of the fiber does not melt.

Examples of suitable multi-component fibers include polyolefin (e.g., polyethylene/PET, coPET (e.g., melt amorphous, melt crystalline)/PET, PBT/PET, and polyethylene/polypropylene. In this listing of multi-component fibers, the convention is to list the material having the lower melting temperature (e.g., first material) separated from the material having the higher melting temperature (e.g., second material) with a "/". Other suitable compositions are known to those of skill in the art. In some embodiments, the binder fiber may include a vinyl compounds (e.g., polyvinyl alcohol).

In some embodiments, the weight percentage of multi-component fibers (e.g., bi-component fibers) in the non-woven web may be 0%, greater than or equal to about 1 wt. %, greater than or equal to about 4 wt. %, greater than or equal to about 5 wt. %, greater than or equal to about 10 wt. %, or greater than or equal to about 15 wt. % In some embodiments, the weight percentage of the multi-component fibers (e.g., bi-component fibers) in the non-woven web may be less than or equal to about 20 wt. %, less than or equal to about 10 wt. %, less than or equal to about 5 wt. %, or less than or equal to about 4 wt. %. Combinations of the above-referenced ranges are also possible (e.g., greater than about 0 wt. % and less than or equal to about 20 wt. %, greater than about 4 wt. % and less than or equal to about 15 wt. %). Other ranges are also possible. In some embodiments, a non-woven web includes the above-noted ranges of multi-component fibers (e.g., bi-component fibers) with respect to the total weight of fibers in the non-woven web and/or the battery separator.

In some embodiments, the non-woven web may include one or more additional types of fibers. The one or more additional fibers may include natural fibers (e.g., cellulose), carbon fibers, nanofibers, and/or fibrillated fibers. In some embodiments, the weight percentage of the one or more additional fibers in the non-woven web may be 0 wt. %, greater than or equal to about 0.5 wt. %, greater than or equal to about 1 wt. %, greater than or equal to about 2 wt. %, greater than or equal to about 5 wt. %, or greater than or equal to about 7 wt. %. In certain embodiments, the weight percentage of the one or more additional fibers in the non-woven web may be less than or equal to about 10 wt. %, less than or equal to about 7 wt. %, less than or equal to about 5 wt. %, less than or equal to about 2 wt. %, less than or equal to about 1 wt. %, or less than or equal to about 0.5 wt. %. Combinations of the above-referenced ranges are also possible (e.g., greater than or equal to about 0.5 wt. % and less than or equal to about 10 wt. %, greater than or equal to about 1 wt. % and less than or equal to about 5 wt. %).

In certain embodiments in which a non-woven web/separator comprises inorganic particles (e.g., silica particles), the non-woven web/separator may include a retention aid. The retention aid may aid in retaining the inorganic particles in the non-woven web. Various types of retention aids can be used. The retention aid may be cationic, anionic, or non-ionic. Non-limiting examples of retention aids include colloidal silica, aluminum chloride, sodium aluminate, polyaluminum sulfate, polyaluminum chloride, cationic or anionic-modified polyacrylamides, guar gum (e.g., amine-treated cationic guar gum), starches (e.g., anionic oxidized starches), and non-ionic polymeric materials such as polyacrylamide and polyethylene oxide. Other retention aids are also possible.

The amount of the retention aid present in the non-woven web/separator may be, for example, at least about 0.02 wt %, at least about 0.04 wt %, at least about 0.05 wt %, at least about 0.1 wt %, at least about 0.15 wt %, at least about 0.2 wt %, at least about 0.3 wt %, at least about 0.4 wt %, or at least about 0.5 wt % of the total weight of the non-woven web/separator. In certain embodiments, the amount of retention aid present in the non-woven web/separator may be less than or equal to about 1 wt %, less than or equal to about 0.5 wt %, less than or equal to about 0.4 wt %, less than or equal to about 0.3 wt %, less than or equal to about 0.2 wt %, less than or equal to about 0.15 wt %, less than or equal to about 0.1 wt %, less than or equal to about 0.05 wt %, or less than or equal to about 0.05 wt % of the total weight of the non-woven web/separator. Combinations of the above referenced ranges are also possible (e.g., between about 0.02 wt % and about 0.5 wt %). Other ranges are also possible. The weight percentage of retention aid in the non-woven web and/or battery separator is based on the dry solids.

The retention aid may be added to the fiber web in any suitable manner. In some embodiments, the retention aid is added to the fiber slurry during formation of the non-woven web. In some embodiments, one or more of the above-noted ranges of retention aid may be added to a fiber slurry during formation of the non-woven web, and the weight percentages may be based on the solids present in the slurry.

Figure 3A:
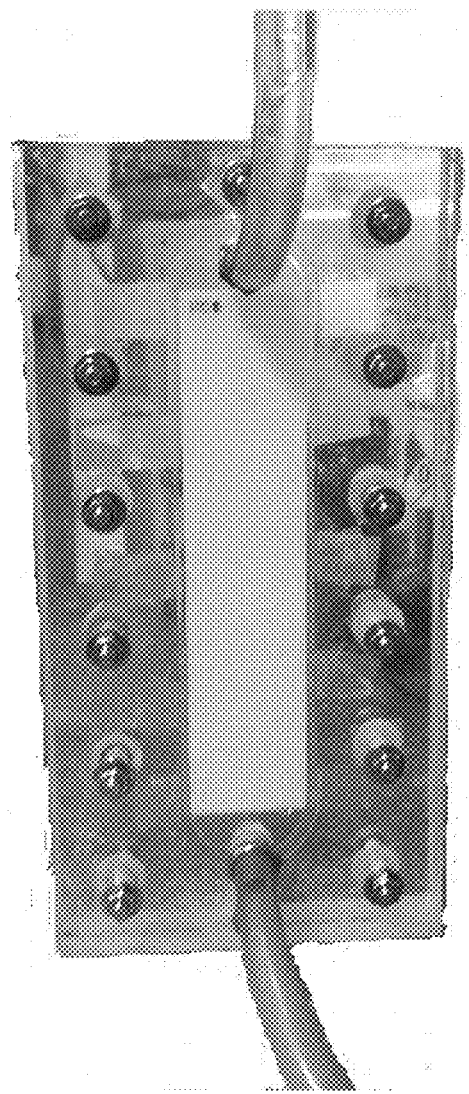
FIG. 3A is a photograph of a testing apparatus for determining the acid filling time of a non-woven web according to one set of embodiments.

In some embodiments, a non-woven web (e.g., a non-woven web comprising a plurality of glass fibers and a plurality of inorganic particles) described herein has a desirable acid filling time (e.g., the time for filling the battery separator with an acid electrolyte), as described herein. In some embodiments, the acid filling time is less than or equal to about 200 seconds, less than or equal to about 150 seconds, less than or equal to about 100 seconds, less than or equal to about 75 seconds, or less than or equal to about 50 seconds. In certain embodiments, the acid filling time is greater than or equal to about 30 seconds, greater than or equal to about 50 seconds, greater than or equal to about 75 seconds, greater than or equal to about 100 seconds, or greater than or equal to about 150 seconds. Combinations of the above-referenced ranges are also possible (e.g., greater than or equal to about 30 seconds and less than or equal to about 200 seconds, greater than or equal to about 50 seconds and less than or equal to about 150 seconds). Other ranges are also possible. As determined herein, acid filling time is measured by placing a 6.0 inch (measured in the machine direction (MD))×1.9 inch sample non-woven web/separator cut in the machine direction upright between two plates (e.g., polycarbonate plates) and surrounded by a gasket (e.g., so that acid does not go beyond the sides of the non-woven web). An exemplary test apparatus is shown in FIG. 3A. An inlet to the space between the plates (i.e., within the area defined by the gasket and where the sample is present) is positioned near the top of the sample, and an outlet is positioned near the bottom of the sample. The plates are separated by a distance such that the separator sample has an average density of about 200 $g/m^2/mm$. For example, the plates may be separated by first determining the thickness of the separator required to obtain an average density of about 200 $g/m^2/mm$, and placing shims of specific thickness(es) between the plates to maintain that thickness. Acid is filled into the inlet such that the acid contacts the top edge of the sample. Vacuum (530 mm Hg of pressure) is then applied at the outlet. The acid filling time is determined by the amount of time required for the acid to travel 6 inches vertically through the sample. The timing is stopped at the moment the acid is seen exiting the bottom of the upright sample. The test is performed at ambient pressure and at a temperature of between about 15-25 degrees Celsius.

In some embodiments, a non-woven web (e.g., a non-woven web comprising a plurality of glass fibers and a plurality of inorganic particles) described herein has a particular acid absorption capacity. Acid absorption capacity, as used herein, is measured as the weight of acid in grams absorbed by the non-woven web per weight of non-woven web. In some embodiments, the acid absorption capacity of the non-woven web is greater than or equal to about 7 g acid/g non-woven web, greater than or equal to about 7.5 g acid/g non-woven web, greater than or equal to about 8 g acid/g non-woven web, greater than or equal to about 8.5 g acid/g non-woven web, greater than or equal to about 9 g acid/g non-woven web, or greater than or equal to about 9.5 g acid/g non-woven web. In certain embodiments, the acid absorption capacity of the non-woven web is less than or equal to about 10 g acid/g non-woven web, less than or equal to about 9.5 g acid/g non-woven web, less than or equal to about 9 g acid/g non-woven web, less than or equal to about 8.5 g acid/g non-woven web, less than or equal to about 8 g acid/g non-woven web, or less than or equal to about 7.5 g acid/g non-woven web. Combinations of the above-referenced ranges are also possible (e.g., greater than or equal to about 7 g acid/g non-woven web and less than or equal to about 10 g acid/g non-woven web, greater than or equal to about 8 g acid/g non-woven web and less than or equal to about 9.5 g acid/g non-woven web). Other ranges are also possible. As determined herein, acid absorption capacity is measured by preparing a sample of non-woven web, measuring the dry weight of the non-woven web, and submerging the non-woven web into an acid electrolyte (a sulfuric acid solution having a specific gravity of 1.28 $g/cm^3$) (e.g., for about 15 minutes) such that the electrolyte is absorbed. The sample is removed from the acid electrolyte and excess electrolyte is removed by hanging the sample with tweezers and allowing the excess acid to drip from the sample. The non-woven web is weighed after the electrolyte no longer drips from the web for 1 minute. The acid absorption capacity is the difference in the wet weight (e.g., the non-woven web and the absorbed acid electrolyte) and the dry weight of the non-woven web, divided by the dry weight of the non-woven web. The test is performed at ambient pressure and at a temperature of between about 15-25 degrees Celsius.

In some embodiments, a non-woven web (e.g., a non-woven web comprising a plurality of glass fibers and a plurality of inorganic particles) described herein has a particular acid stratification distance. The acid stratification distance is a measure of the distance of which the acid electrolyte displaces an sulfuric acid solution having a specific gravity of 1.1 $g/cm^3$ in a non-woven web within 60 min (e.g., while under compression). In some embodiments, the acid stratification distance of the non-woven web is greater than or equal to about 0.5 cm, greater than or equal to about 1 cm, greater than or equal to about 2 cm, greater than or equal to about 3 cm, or greater than or equal to about 4 cm. In certain embodiments, the acid stratification distance of the non-woven web is less than or equal to about 5 cm, less than or equal to about 4 cm, less than or equal to about 3 cm, less than or equal to about 2 cm, or less than or equal to about 1 cm. Combinations of the above-referenced ranges are also possible (e.g., greater than or equal to about 0.5 cm and less than or equal to about 5 cm, greater than or equal to about 1 cm and less than or equal to about 3 cm). Other ranges are also possible.

Figure 3B:
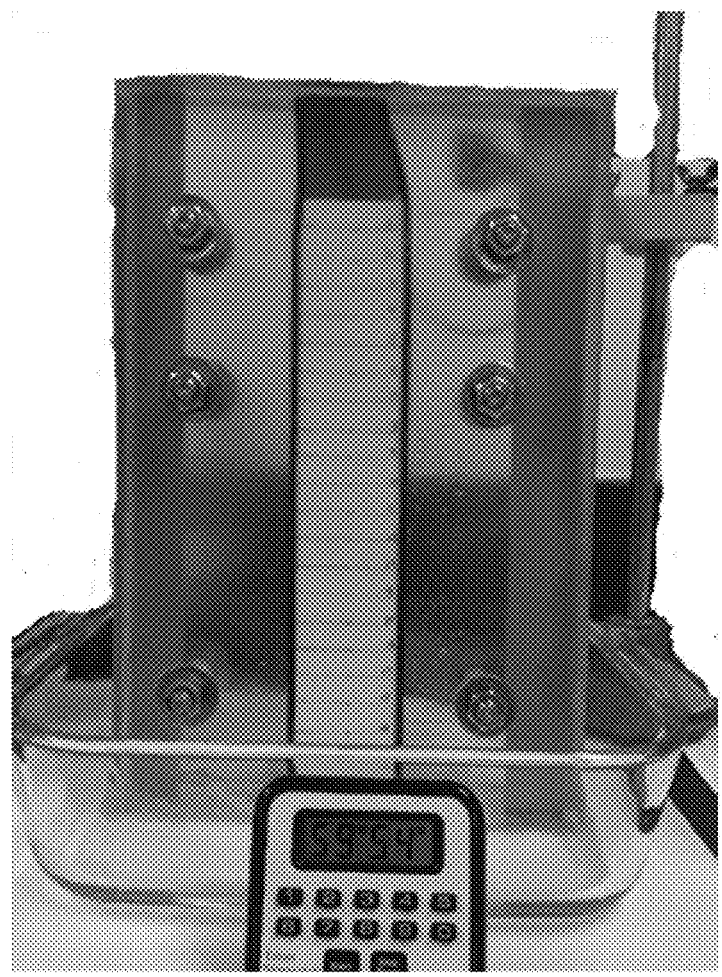
FIG. 3B is a photograph of a testing apparatus for determining the acid stratification distance of a non-woven web according to one set of embodiments.

As determined herein, acid stratification distance is measured by first immersing a 8.5 inches (measured in the MD)×1.5 inches sample of non-woven web/separator in an sulfuric acid solution having a specific gravity of 1.1 $g/cm^3$ for about one minute, e.g., until the non-woven web is saturated with the acid. Then the saturated sample is placed upright, vertically-oriented, between two plates (e.g., polycarbonate plates) and surrounded by a gasket (e.g., such that acid does not go beyond the sides of the sample), such that the top surface of the sample is accessible at the top of the plates. An exemplary test apparatus is shown in FIG. 3B. The plates are separated at a distance such that the separator sample has an average density of about 240 $g/m^2/mm$. For example, the plates may be separated by first determining the thickness of the separator required to obtain an average density of about 240 $g/m^2/mm$, and placing shims of specific thickness(es) between the plates to maintain that thickness. A volume of 10-25 mL of an acid electrolyte (sulfuric acid having a specific gravity of about 1.28 $g/cm^3$ containing a soluble dye) is introduced into the accessible region at the top of the non-woven web between the plates until it just contacts the top edge of the sample. The distance the acid electrolyte travels downward after 60 minutes (displacing the initial acid within the non-woven web) is determined (i.e. the acid stratification distance). If there is variation in the distance the acid electrolyte travels (e.g., variation across the width of the sample), the middle point between the highest and lowest distances is used to calculate the acid stratification distance. The test is performed at ambient pressure and at a temperature of between about 15-25 degrees Celsius.

Figure 4:
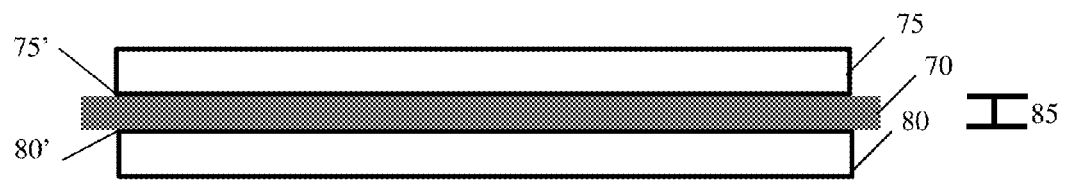
FIG. 4 is a schematic diagram showing a battery arrangement according to one set of embodiments.

FIG. 4 shows a cross-section of an exemplary battery arrangement. FIG. 4 shows a cross-section of a battery arrangement comprising a planar battery separator 70 (e.g., including a non-woven web described herein) positioned between and in direct contact with a negative electrode 75 and a positive electrode 80. In FIG. 4, the entire surface area of the negative electrode and the positive electrode are in contact with the planar battery separator.

In some embodiments, the battery separator including a non-woven web comprising a plurality of inorganic may have desirable structural properties.

In some embodiments, the basis weight of one or more layers of the battery separator (e.g., the non-woven web and/or the overall battery separator) may range from between about 25 g/m$^2$ and about 500 g/m$^2$. For instance, in some embodiments, the basis weight of one or more layers of the battery separator (e.g., the non-woven web and/or the overall battery separator) may be greater than or equal to about 25 g/m$^2$, greater than or equal to about 40 g/m$^2$, greater than or equal to about 60 g/m$^2$, greater than or equal to about 80 g/m$^2$, greater than or equal to about 100 g/m$^2$, greater than or equal to about 150 g/m$^2$, greater than or equal to about 200 g/m$^2$, greater than or equal to about 250 g/m$^2$, greater than or equal to about 300 g/m$^2$, greater than or equal to about 350 g/m$^2$ or greater than or equal to about 400 g/m$^2$. In some cases, the basis weight of one or more layers of the battery separator (e.g., the non-woven web and/or the overall battery separator) may be less than or equal to about 500 g/m$^2$, less than or equal to about 430 g/m$^2$, less than or equal to about 400 g/m$^2$, less than or equal to about 350 g/m$^2$, less than or equal to about 300 g/m$^2$, less than or equal to about 250 g/m$^2$, less than or equal to about 200 g/m$^2$, less than or equal to about 150 g/m$^2$, less than or equal to about 100 g/m$^2$, less than or equal to about 75 g/m$^2$, or less than or equal to about 50 g/m$^2$. Combinations of the above-referenced ranges are also possible (e.g., greater than or equal to about 25 g/m$^2$ and less than or equal to about 500 g/m$^2$, greater than or equal to about 80 g/m$^2$ and less than or equal to about 430 g/m$^2$). Other ranges are also possible. As determined herein, the basis weight of the non-woven web and/or battery separator is measured according to the BCIS-03A, September 2009, Method 3.

In some embodiments, the specific surface area of one or more layers of the battery separator (e.g., the non-woven web and/or the overall battery separator) may range from between about 1 m$^2$/g and about 100 m$^2$/g. For instance, in some embodiments, the specific surface area of one or more layers of the battery separator (e.g., the non-woven web and/or the overall battery separator) may be greater than or equal to about 1 m$^2$/g, greater than or equal to about 2 m$^2$/g, greater than or equal to about 5 m$^2$/g, greater than or equal to about 10 m$^2$/g, greater than or equal to about 20 m$^2$/g, greater than or equal to about 50 m$^2$/g, or greater than or equal to about 75 m$^2$/g. In certain embodiments, the specific surface area of one or more layers of the battery separator (e.g., the non-woven web and/or the overall battery separator) may be less than or equal to about 100 m$^2$/g, less than or equal to about 75 m$^2$/g, less than or equal to about 50 m$^2$/g, less than or equal to about 20 m$^2$/g, less than or equal to about 10 m$^2$/g, less than or equal to about 5 m$^2$/g, or less than or equal to about 2 m$^2$/g. Combinations of the above-referenced ranges are also possible (e.g., greater than or equal to about 1 m$^2$/g and less than or equal to about 100 m$^2$/g, greater than or equal to about 5 m$^2$/g and less than or equal to about 75 m$^2$/g). Other ranges are also possible. As determined herein, the specific surface area of the non-woven web and/or battery separator is measured according to the BCIS-03A, September 2009, Method 8.

Thickness, as referred to herein, is determined according to BCIS 03-A September 2009, Method 10 using 10 kPa pressure. The thickness of one or more layers of the battery separator (e.g., the non-woven web and/or the overall battery separator) may be between about 0.05 mm and about 5 mm. In some embodiments, the thickness of the non-woven web and/or battery separator may be greater than or equal to about 0.05 mm, greater than or equal to about 0.1 mm, greater than or equal to about 0.2 mm, greater than or equal to about 0.3 mm, greater than or equal to about 0.5 mm, greater than or equal to about 0.8 mm, greater than or equal to about 1 mm, greater than or equal to about 1.2 mm, greater than or equal to about 1.5 mm, greater than or equal to about 1.8 mm, greater than or equal to about 2 mm, greater than or equal to about 2.5 mm, greater than or equal to about 3 mm, greater than or equal to about 3.5 mm, greater than or equal to about 4 mm, or greater than or equal to about 4.5 mm. In certain embodiments, the thickness of one or more layers of the battery separator (e.g., the non-woven web and/or the overall battery separator) may be less than or equal to about 5 mm, less than or equal to about 4.5 mm, less than or equal to about 4 mm, less than or equal to about 3.5 mm, less than or equal to about 3 mm, less than or equal to about 2.5 mm, less than or equal to about 2.0 mm, less than or equal to about 1.8 mm, less than or equal to about 1.5 mm, less than or equal to about 1.2 mm, less than or equal to about 1 mm, less than or equal to about 0.8 mm, less than or equal to about 0.6 mm, less than or equal to about 0.4 mm, or less than or equal to about 0.2 mm. Combinations of the above-referenced ranges are also possible (e.g., greater than about 0.05 mm and less than or equal to about 5 mm, greater than about 0.1 mm and less than or equal to about 4 mm). Other ranges are also possible.

The thickness of one or more layers of the battery separator (e.g., the non-woven web and/or the overall battery separator) described herein may vary, for example, between about 0.05 mm and about 30 mm. In some embodiments, the thickness of the non-woven web and/or battery separator may be greater than or equal to about 0.05 mm, greater than or equal to about 0.1 mm, greater than or equal to about 0.5 mm, greater than or equal to about 1 mm, greater than or equal to about 2 mm, greater than or equal to about 3 mm, greater than or equal to about 5 mm, greater than or equal to about 8 mm, greater than or equal to about 10 mm, greater than or equal to about 12 mm, greater than or equal to about 15 mm, greater than or equal to about 20 mm, or greater than or equal to about 25 mm. In certain embodiments, the thickness of one or more layers of the battery separator (e.g., the non-woven web and/or the overall battery separator) may be less than or equal to about 30 mm, less than or equal to about 28 mm, less than or equal to about 25 mm, less than or equal to about 20 mm, less than or equal to about 18 mm, less than or equal to about 15 mm, less than or equal to about 12 mm, less than or equal to about 10 mm, less than or equal to about 8 mm, less than or equal to about 6 mm, less than or equal to about 3 mm, less than or equal to about 2 mm, less than or equal to about 1 mm, or less than or equal to about 0.5 mm. Combinations of the above-referenced ranges are also possible (e.g., greater than about 0.05 mm and less than or equal to about 30 mm, greater than about 0.5 mm and less than or equal to about 3 mm). Overall thickness, as referred to herein, is determined according to BCIS 03-A September 2009, Method 10 using 10 kPa pressure.

In some embodiments, a non-woven web and/or battery separator described herein may have a density of, for example, between about 100 g/m²/mm and about 250 g/m²/mm. For instance, in some embodiments, the density of one or more layers of the battery separator (e.g., the non-woven web and/or the overall battery separator) may be less than or equal to about less than or equal to 250 g/m²/mm, less than or equal to about less than or equal to about 225 g/m²/mm, less than or equal to about 200 g/m²/mm, less than or equal to about 175 g/m²/mm, less than or equal to about 150 g/m²/mm, or less than or equal to about 125 g/m²/mm. In some cases, the density of one or more layers of the battery separator (e.g., the non-woven web and/or the overall battery separator) may be greater than or equal to about 100 g/m²/mm, greater than or equal to about 150 g/m²/mm, or greater than or equal to about 200 g/m²/mm. Combinations of the above-referenced ranges are also possible (e.g., greater than or equal to about 100 g/m²/mm and less than or equal to about 250 g/m²/mm greater than or equal to about 125 g/m²/mm and less than or equal to about 200 g/m²/mm). Other ranges are also possible. As determined herein, the density of one or more layers of the battery separator (e.g., the non-woven web and/or the overall battery separator) is measured by dividing the basis weight determined according to BCIS-03A September 2009, Method 3 of the non-woven web (and/or battery separator) by the thickness of the non-woven web (and/or battery separator) determined according to BCIS 03-A September 2009, Method 10 under 10 kPa.

One or more layers of the battery separator (e.g., the non-woven web and/or the overall battery separator) may have a suitable largest pore size. As described herein, the largest pore size of the fiber web may influence the acid filling times and/or acid stratification distances. In some embodiments, the largest pore size of the non-woven web and/or battery separator may be less than or equal to about 25 microns, less than or equal to about 20 microns, less than or equal to about 18 microns, less than or equal to about 16 microns, less than or equal to about 14 microns, less than or equal to about 12 microns, or less than or equal to about 10 microns. In other embodiments, the largest pore size may be greater than or equal to about 8 microns, greater than or equal to about 10 microns, greater than or equal to about 12 microns, greater than or equal to about 14 microns, or greater than or equal to about 16 microns. Combinations of the above-referenced ranges are also possible (e.g., greater than or equal to about 8 microns and less than or equal to about 18 microns, greater than or equal to about 10 microns and less than or equal to about 16 microns). Other values and ranges of largest pore size are also possible. Largest pore size, as determined herein, is measured using liquid porosimetry according to the standard BCIS-03A, September 2009, Method 6.

One or more layers of the battery separator (e.g., the non-woven web and/or the overall battery separator) may exhibit a suitable median pore size, e.g., for ionic conduction. In some embodiments, the median pore size of the non-woven web and/or battery separator may be less than or equal to about 7 microns, less than or equal to about 6.5 microns, less than or equal to about 6 microns, less than or equal to about 5.5 microns, less than or equal to about 5 microns, less than or equal to about 4.5 microns, less than or equal to about 4 microns, less than or equal to about 3.5 microns, or less than or equal to about 3 microns. In other embodiments, the median pore size may be greater than or equal to about 2.5 microns, greater than or equal to about 3 microns, greater than or equal to about 3.5 microns, greater than or equal to about 4 microns, greater than or equal to about 5 microns, or greater than or equal to about 6 microns. Combinations of the above-referenced ranges are also possible (e.g., greater than or equal to about 2.5 microns and less than or equal to about 4.5 microns, greater than or equal to about 3 microns and less than or equal to about 4 microns). Other values and ranges of median pore size are also possible. Median pore size, as determined herein, is measured according to the standard BCIS-03A, September 2009, Method 6.

In some embodiments, a battery separator described herein comprising a non-woven web includes a plurality of inorganic particles (e.g., silica) and has a combination of largest pore size and median pore size within specific ranges. In one set of embodiments, the battery separator and/or nonwoven web has a largest pore size ranging between about 8 microns and about 18 microns (e.g., a largest pore size ranging between about 10 microns and about 16 microns), and a median pore size ranging between about 2.5 microns and about 4.5 microns (e.g., a median pore size between about 3 microns and about 4 microns), although other ranges, such as those described above, are also possible. The battery separator and/or nonwoven web may exhibit a relatively fast acid filling time and/or a relatively low acid stratification distance (e.g., as compared to battery separator and/or a non-woven web having different largest and/or median pore sizes, and/or one that is substantially free of inorganic particles, all other factors being equal). The battery separator and/or nonwoven web may have an acid filling time of, for example, less than or equal to about 200 seconds and/or an acid stratification distance of, for example, less than or equal to about 5 cm.

In some embodiments, a non-woven web and/or battery separator described herein may have desirable mechanical strength characteristics. For example, one or more layers of the battery separator (e.g., the non-woven web and/or the overall battery separator) may have a dry tensile strength in the machine direction of greater than or equal to about 0.2 lbs/in, greater than or equal to about 0.5 lbs/in, greater than or equal to about 1 lb/in, greater than or equal to about 2 lbs/in, greater than or equal to about 5 lbs/in, greater than or equal to about 10 lbs/in, greater than or equal to about 12 lbs/in, or greater than or equal to about 15 lbs/in. In some instances, the dry tensile strength in the machine direction may be less than or equal to about 20 lbs/in, less than or equal to about 15 lbs/in, less than or equal to about 12 lbs/in, less than or equal to about 10 lbs/in, less than or equal to about 5 lbs/in, less than or equal to about 2 lbs/in, less than or equal to about 1 lb/in, or less than or equal to about 0.5 lbs/in. Combinations of the above-referenced ranges are also possible (e.g., greater than or equal to about 0.5 lbs/in and less than or equal to about 20 lbs/in, greater than or equal to about 1 lb/in and less than or equal to about 15 lbs/in). The dry tensile strength in the machine direction may be determined using the standard BCIS 03B Rev March 2010 Method 4.

In some embodiments, the puncture strength (or puncture resistance) of a battery separator and/or a non-woven web described herein may be greater than or equal to about 1 N, greater than or equal to about 1.5 N, greater than or equal to about 2 N, greater than or equal to about 3 N, greater than or equal to about 5 N, greater than or equal to about 8 N, greater than or equal to about 10 N, greater than or equal to about 12N, or greater than or equal to about 15 N. In some instances, the puncture strength (or puncture resistance) may be less than or equal to about 20 N, less than or equal to about 18 N, less than or equal to about 15 N, less than or equal to about 12 N, less than or equal to about 10 N, less than or equal to about 8 N, less than or equal to about 5 N, or less than or equal to about 3 N. Combinations of the above-referenced ranges are also possible (e.g., greater than or equal to about 1 N and less than or equal to about 20 N, greater than or equal to about 5 N and less than or equal to about 15 N). The puncture strength may be determined using protocol BCIS 03B Rev March 2010 Method 9.

In some embodiments, the pressure loss of a battery separator and/or a non-woven web described herein may be less than or equal to about 30%, less than or equal to about 25%, or less than or equal to about 20%. In certain embodiments, the pressure loss of a battery separator and/or a non-woven web described herein may be greater than or equal to about 15%, greater than or equal to about 20%, or greater than or equal to about 25%. Combinations of the above-referenced ranges are also possible (e.g., greater than or equal to about 15% and less than or equal to about 30%, greater than or equal to about 15% and less than or equal to about 25%). Other ranges are also possible. The pressure loss may be determined by placing a 10 cm×10 cm non-woven web/separator sample into a plastic bag (e.g., 12 cm×12 cm), and applying an in initial pressure of 30 kPa to the (dry) non-woven web/separator sample for 5 minutes (e.g., by placing the plastic bag between computer-operated plates and applying an external force (e.g., of 30 kPa) to the non-woven web/separator sample with the plates). The instrument is calibrated to take into account the thickness of the bag. About 20 mL of electrolyte (a sulfuric acid solution with a specific gravity of 1.28 g/cm$^3$) is added to the bag while the distance between the plates is maintained. The application of 30 kPa pressure to the sample is ceased, and while the distance between the plates is maintained, the pressure exerted by the plates on the sample after one hour is measured (e.g., by a load cell located behind one plate). The test is performed at ambient pressure and at a temperature of between about 15-25 degrees Celsius. The percent loss of pressure (i.e. pressure loss) is calculated to be 100%×(30−pressure in kPa recorded after 1 hr)/30.

In some embodiments, a non-woven web and/or battery separator described herein may have a tendency of losing thickness under cycles of compression pressure (e.g., compressed between 10 kPa and 50 kPa). The percent thickness loss is a general measure of elasticity of the non-woven web and/or battery separator, related to the ability of the non-woven web and/or battery separator to recover to its original thickness (or volume) after an applied pressure is removed. Generally, the lower the percent thickness loss, the more elastic the non-woven web and/or battery separator. In some embodiments, the performance of the battery may be influenced by the elasticity of the non-woven web/separator, wherein the more elastic the non-woven web and/or battery separator (e.g., the lower the percent thickness loss), the better the performance of the battery comprising the non-woven web/separator.

In some embodiments, the percent thickness loss of a non-woven web and/or battery separator described herein at 10 kPa of pressure is less than or equal to about 30%, less than or equal to about 26.7%, less than or equal to about 23.4%, less than or equal to about 20.1%, less than or equal to about 16.8%, or less than or equal to about 13.5%. In some embodiments, the percent thickness loss for the non-woven and/or battery separator at 10 kPa of pressure is greater than or equal to about 1%, greater than or equal to about 5%, greater than or equal to about 10%, greater than or equal to about 13.5%, greater than or equal to about 16.8%, greater than or equal to about 20.1%, greater than or equal to about 23.4%, or greater than or equal to about 26.7% Combinations of the above-referenced ranges are also possible (e.g., less than or equal to about 30% and greater than or equal to about 10%, less than equal to about 16.8% and greater than or equal to about 10%.). Other ranges are also possible.

In some embodiments, the percent thickness loss for a non-woven web and/or battery separator described herein at 50 kPa of pressure is less than or equal to about 15%, less than or equal to about 10%, less than or equal to about 7.8%, less than or equal to about 6.1%, less than or equal to about 4.5%, or less than or equal to about 2.8%. In some embodiments, the percent thickness loss of the non-woven and/or battery separator at 50 kPa of pressure is greater than or equal to about 1.2%, greater than or equal to about 2.8%, greater than or equal to about 4.5%, greater than or equal to about 6.1%, or greater than or equal to about 10%. Combinations of the above-referenced ranges are also possible (e.g., less than or equal to about 7.8% and greater than or equal to about 1.2%, greater than or equal to about 1.2% and less than or equal to about 6.1%). Other ranges are also possible.

As used herein, percent thickness loss of the non-woven web/separator is determined by placing a 10 cm×10 cm sample non-woven web/separator into a plastic bag (e.g., 12 cm×12 cm) and adding an acid electrolyte (sulfuric acid with a specific gravity of 1.28 g/cm$^3$) to the bag such that the non-woven web/separator is fully saturated (e.g., 15-30 mL). The instrument is calibrated to take into account the thickness of the bag. The plastic bag is compressed by a compression tester to about 10 kPa and then cycled between about 10 kPa and about 50 kPa for 20 cycles (wherein each cycle is 180 seconds). The percent change in thickness at a particular pressure (e.g., 10 kPa or 50 kPa) is calculated by taking the difference of the thickness of the non-woven web/separator at the 20$^{th}$ cycle at the particular pressure (e.g., 10 kPa or 50 kPa) and the thickness of the non-woven web/separator at the 1$^{st}$ cycle at that particular pressure (e.g., 10 kPa or 50 kPa), and dividing the difference by the thickness of the non-woven web/separator at the 1$^{st}$ cycle at the particular pressure (e.g., 10 kPa or 50 kPa), and multiplying by 100%. The test is performed at ambient pressure and at a temperature of between about 15-25 degrees Celsius.

It should be appreciated that although some of the parameters and characteristics noted above are described with respect to non-woven webs, the same parameters and characteristics (including the values and ranges for such parameters and characteristics) may also be applied to a battery separator including the non-woven web.

As noted above, a separator described herein may be used in a battery (e.g., lead acid battery). The battery may comprise a negative plate, a positive plate, and a battery separator (e.g., including a non-woven web described herein) disposed between the negative and positive plates.

It is to be understood that the other components of the battery that are not explicitly discussed herein can be conventional battery components. Positive plates and negative plates can be formed of conventional lead acid battery plate materials. For example, in container formatted batteries, plates can include grids that include a conductive material, which can include, but is not limited to, lead, lead alloys, graphite, carbon, carbon foam, titanium, ceramics (such as Ebonex®), laminates and composite materials. The grids are typically pasted with active materials. The pasted grids are typically converted to positive and negative battery plates by a process called "formation." Formation involves passing an electric current through an assembly of alternating positive and negative plates with separators between adjacent plates while the assembly is in a suitable electrolyte (e.g., to convert pasted oxide to active materials).

As a specific example, positive plates may contain lead dioxide as the active material, and negative plates may contain lead as the active material. Plates can also contain one or more reinforcing materials, such as chopped organic fibers (e.g., having an average length of 0.125 inch or more), chopped glass fibers, metal sulfate(s) (e.g., nickel sulfate, copper sulfate), red lead (e.g., a $Pb_3O_4$-containing material), litharge, paraffin oil, and/or expander(s). In some embodiments, an expander contains barium sulfate, carbon black and lignin sulfonate as the primary components. The components of the expander(s) can be pre-mixed or not pre-mixed. Expanders are commercially available from, for example, Hammond Lead Products (Hammond, Ind.) and Atomized Products Group, Inc. (Garland, Tex.).

An example of a commercially available expander is the Texex® expander (Atomized Products Group, Inc.). In certain embodiments, the expander(s), metal sulfate(s) and/or paraffin are present in positive plates, but not negative plates. In some embodiments, positive plates and/or negative plates contain fibrous material or other glass compositions.

A battery can be assembled using any desired technique. For example, a separator may be cut into a sheet and may be placed between two plates, or the separator may be wrapped around the plates (e.g., positive electrode, negative electrode). The positive plates, negative plates and separators are then assembled in a case using conventional lead acid battery assembly methods. The battery separators may be used, in some embodiments, as a leaf separator, an envelope separator, and/or in a wound configuration. In certain embodiments, the separators are compressed after they are assembled in the case, i.e., the thickness of the separators are reduced after they are placed into the case. An electrolyte (e.g., sulfuric acid) is then disposed in the case. It should be understood that the shapes (e.g., planar) of the battery separators described herein are non-limiting and the battery separators described herein may have any suitable shape.

In some embodiments, the electrolyte used with a battery separator described herein is sulfuric acid. In some embodiments, the specific gravity of the sulfuric acid is between 1.21 $g/cm^3$ and 1.32 $g/cm^3$ (e.g., between 1.28 $g/cm^3$ and 1.31 $g/cm^3$). In certain embodiments the specific gravity of the sulfuric acid is 1.26 $g/cm^3$. In certain embodiments the specific gravity of the sulfuric acid is about 1.3 $g/cm^3$. Although a sulfuric acid-based electrolyte is predominantly described herein, it should be appreciated that the electrolyte can include other compositions.

In some embodiments, the battery separators (including the non-woven webs described herein) may be used in lead acid batteries including valve-regulated batteries (e.g., absorbent glass mat batteries). In a valve-regulated lead acid (VRLA) battery, for example, the internal environment is controlled by a valve for venting, the valve vents gas (e.g., hydrogen, oxygen) from the battery as pressure builds. The valve is a pressure relief valve, only opening when the internal battery pressure reaches a threshold. When the internal pressure in the battery is below this threshold the valve prevents either gas from escaping. The generated $O_2$ can diffuse from the positive electrode to the negative electrode and recombine with the $H_2$ to form water. The ability of oxygen and hydrogen to recombine in the battery governs several facets of the battery performance and safety. Pure oxygen and hydrogen are explosive gases, and thus recombination is important to avoid an explosive battery. A low level of recombination of oxygen and hydrogen also negatively affects the charge acceptance of the battery. The battery separators described herein may facilitate the recombination of oxygen and/or hydrogen, and thus increase the efficiency and performance of the battery.

In some embodiments two or more layers of a web may be formed separately, and combined by any suitable method such as lamination, collation, or by use of adhesives. The two or more layers may be formed using different processes, or the same process. For example, each of the layers may be independently formed by a wet laid process, a non-wet laid process, or any other suitable process.

In some embodiments, two or more layers may be formed by the same process. In some instances, the two or more layers may be formed simultaneously.

Different layers may be adhered together by any suitable method. For instance, layers may be adhered by an adhesive and/or melt-bonded to one another on either side. Lamination and calendering processes may also be used. In some embodiments, an additional layer may be formed from any type of fiber or blend of fibers via an added headbox or a coater and appropriately adhered to another layer.

In some embodiments, one or more layer in the battery separator may be designed to be discrete from another layer. That is, the components (e.g., fibers) from one layer do not substantially intermingle (e.g., do not intermingle at all) with components (e.g., fibers) from another layer. For example, with respect to FIG. 1, in one set of embodiments, fibers from non-woven web 6 do not substantially intermingle with fibers of optional layer 7. Discrete layers may be joined by any suitable process including, for example, lamination, thermo-dot bonding, calendering, ultrasonic processes, or by adhesives, as described in more detail below. It should be appreciated, however, that certain embodiments may include one or more layers that are not discrete with respect to one another.

A battery separator may include any suitable number of layers, e.g., at least 2, at least 3, at least 4, at least 5, at least 6, at least 7 layers. In some embodiments, a battery separator may include up to 10 layers.

Non-woven webs described herein may be produced using suitable processes, such as a wet laid process. In general, a wet laid process involves mixing together fibers of one or more type; for example, glass fibers of one type may be mixed together with glass fibers of another type, and/or with fibers of a different type (e.g., synthetic fibers), to provide a fiber slurry. The slurry may be, for example, an aqueous-based slurry. In certain embodiments, fibers, are optionally stored separately, or in combination, in various holding tanks prior to being mixed together.

For instance, a first fiber may be mixed and pulped together in one container and a second fiber may be mixed and pulped in a separate container. The first fibers and the second fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components (e.g., inorganic particles) may also be introduced into the mixture. Furthermore, it should be appreciated that other combinations of fibers types may be used in fiber mixtures, such as the fiber types described herein.

In certain embodiments, two or more layers are formed by a wet laid process. For example, a first dispersion (e.g., a pulp) containing fibers in a solvent (e.g., an aqueous solvent such as water) can be applied onto a wire conveyor in a papermaking machine (e.g., a fourdrinier or, a round former, or a rotoformer) to form first layer supported by the wire conveyor. A second dispersion (e.g., another pulp) containing fibers in a solvent (e.g., an aqueous solvent such as water) is applied onto the first layer either at the same time or subsequent to deposition of the first layer on the wire. Vacuum is continuously applied to the first and second dispersions of fibers during the above process to remove the solvent from the fibers, thereby resulting in an article containing first and second layers. The article thus formed is then dried and, if necessary, further processed by using known methods to form multi-layered non-woven webs. It should be appreciated that a battery separator may be a single layer of a non-woven web (e.g., formed by a wet laid process) in some embodiments without additional layers attached thereto.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. A non-woven web can also be made with a laboratory handsheet mold in some instances. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% and 0.5% by weight.

In some embodiments in which inorganic particles are included in the fiber web, the inorganic particles may be added to the fiber slurry in any suitable amount. Additional components (e.g., one or more retention aids) may also be added to the slurry. The inorganic particles and/or addition components may be added to the fiber slurry at any stage before the fiber slurry enters the headbox.

In some cases, the pH of the fiber slurry may be adjusted as desired. For instance, fibers of the slurry may be dispersed under acidic or neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder/round former, or an inclined wire fourdrinier.

During or after formation of a non-woven web, the non-woven web may be further processed according to a variety of known techniques. Optionally, additional layers can be formed and/or added to a non-woven web using processes such as lamination, co-pleating, or collation. For example, in some cases, two layers are formed into a composite article by a wet laid process, and the composite article is then combined with a third layer by any suitable process (e.g., lamination, co-pleating, or collation). It can be appreciated that a non-woven web or a composite article formed by the processes described herein may be suitably tailored not only based on the components of each fiber layer, but also according to the effect of using multiple fiber layers of varying properties in appropriate combination to form non-woven webs having the characteristics described herein.

EXAMPLES

The following examples are intended to illustrate certain embodiments of the present invention, but are not to be construed as limiting and do not exemplify the full scope of the invention.

Example 1

The following example illustrates the effect of average fiber diameter and pore size (e.g., largest, median, and smallest) on acid stratification distance and acid filling times of battery separators. The separators tested were each a single layer of non-woven web having the fiber diameters and basis weights shown in Table 1. The separators did not include inorganic particles (e.g., silica).

TABLE 1

Average glass fiber diameter and basis weight of separators A-E

| | Average Fiber Diameter (microns) | Basis Weight (gsm) |
|---|---|---|
| Separator A | 2.48 | 200 |
| Separator B | 2.78 | 200 |
| Separator C | 2.09 | 220 |
| Separator D | 1.61 | 200 |
| Separator E | 1.50 | 200 |

The separators were formed in a typical paper-making process by dispersing glass fibers and other components in water to form a wet stock, and transferring it to a head box to form wet separator sheets. The wet sheets were then passed through a series of heated drums to dry off the water, forming the dry separators. All the separators had a basis weight in the range of 200 to 220 gsm.

Figure 5:
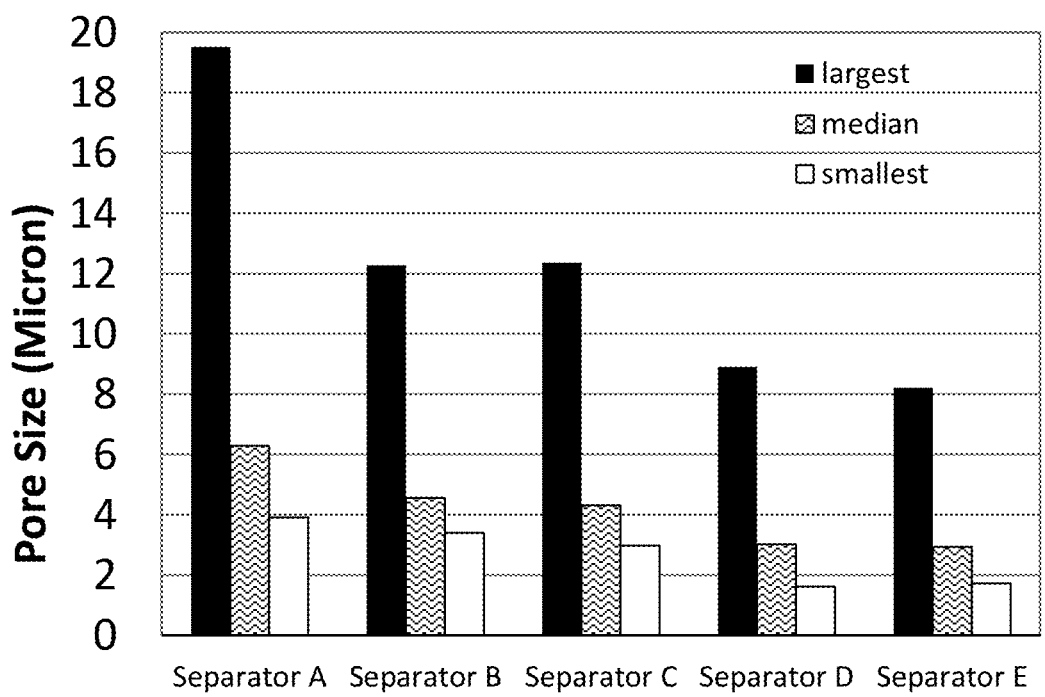
FIG. 5 is a plot of largest, median, and smallest pore sizes for exemplary battery separators, according to one set of embodiments.

FIG. 5 plots the largest, median, and smallest pore sizes of the separators. Separators D and E generally had smaller pore sizes due to the finer glass fibers forming the structures. Particularly, the largest pores present in the structures of separators D and E were below 10 microns. The remaining separators (A-C) were formed with glass fibers with average diameters larger than 2 microns, and had largest and median pores sizes larger than those of separators D and E. Particularly, the largest pores present in these separators A-C were above 10 microns.

Figure 6:
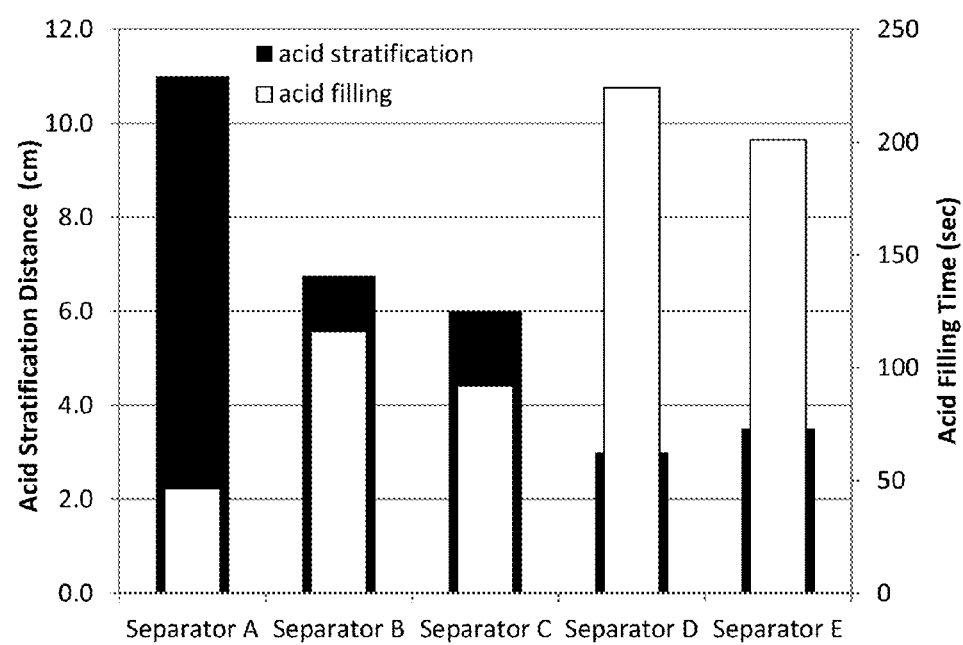
FIG. 6 is a plot of acid stratification distance and acid filling time for the exemplary battery separators in FIG. 5, according to one set of embodiments.

The acid stratification distance and acid filling times were measured for each of the separators, and are plotted in FIG. 6. The testing apparatuses for measuring acid filling time and acid stratification distance are shown in FIG. 3A and FIG. 3B, respectively. The data shows that separators A, B and C, which had largest pore sizes between 12-20 microns, median pore sizes between 4-6.5 microns and an average fiber diameter of greater than or equal to about 2 microns, exhibited faster acid filling times, but had higher acid stratification distances, compared to the separators that had largest and median pore sizes and/or average fiber diameters outside of these ranges (separators D, E). This example illustrates that a separator can achieve a relatively fast acid filling time by controlling the pore size(s) (e.g., largest pore size and/or median pore size) of the separator, but the separator may have a relatively high acid stratification distance.

Example 2

The following example illustrates that the acid stratification distances and the acid filling times of separators comprising varying fiber diameters can be reduced with the incorporation of inorganic particles into the separators.

Figure 7:
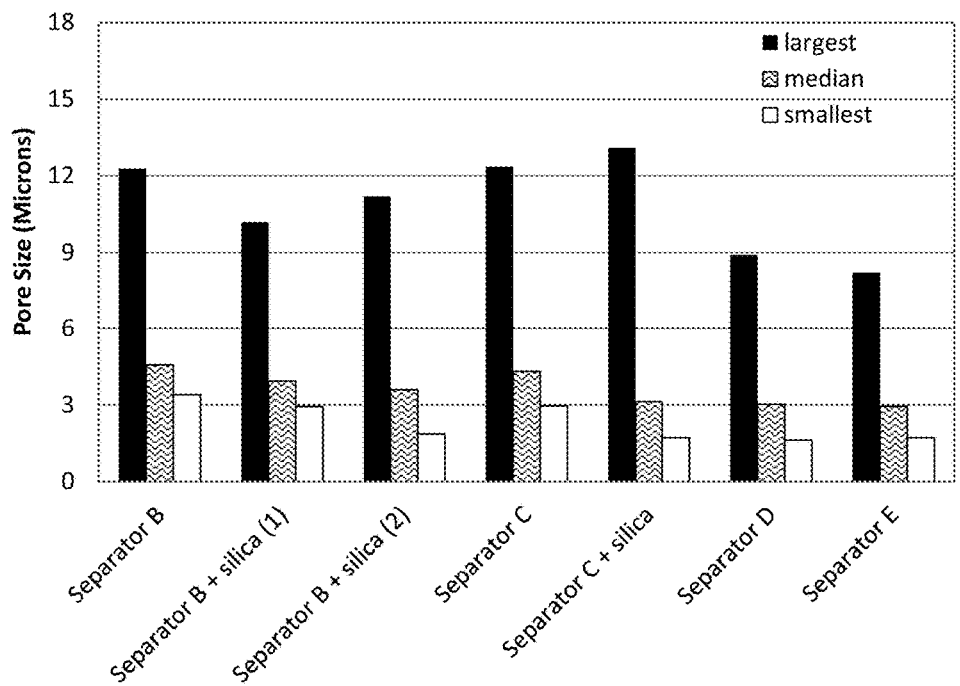
FIG. 7 is a plot of largest, median, and smallest pore sizes for exemplary battery separators, some of which comprise inorganic particles, according to one set of embodiments.

FIG. 7 plots the largest, median, and smallest pore sizes of various separators, including Separator B, Separator B with silica particles at two different specific surface areas, Separator C, Separator C with silica particles, Separator D, and Separator E. Separators B, C, and D were prepared as described in Example 1. The specific surface areas and average glass fiber diameters of these separators are presented in Table 2. The separators incorporating silica particles were prepared in a manner similar as that described in Example 1 except silica particles were added into the glass dispersion during the paper-making process.

TABLE 2

Average glass fiber diameter, basis weight, specific surface area, and wt % inorganic particles in separators

|  | Average Fiber Diameter (microns) | Basis Weight (gsm) | Specific Surface Area ($m^2/g$) | Wt % Inorganic Particles |
|---|---|---|---|---|
| Separator B | 2.78 | 200 | 1.3 | 0 |
| Separator B + silica (1) | 2.78 | 200 | 37.9 | 10 |
| Separator B + silica (2) | 2.78 | 200 | 53.2 | 10 |
| Separator C | 2.09 | 220 | 1.2 | 0 |
| Separator C + silica | 2.09 | 220 | 30.5 | 10 |
| Separator D | 1.61 | 200 | 1.8 | 0 |
| Separator E | 1.50 | 200 | 1.8 | 0 |

It can be seen that incorporating silica into separator B and separator C generally significantly increased the specific surface areas of the separators. As shown in FIG. 7, separators B and C including silica tended to have pore median sizes smaller than those of separators B and C without silica, respectively. In addition, separator B with silica and separator C with silica had larger pores than separators D and E; particularly, the largest pores present in these silica-filled separators were much larger than those of separators D and E.

Figure 8:
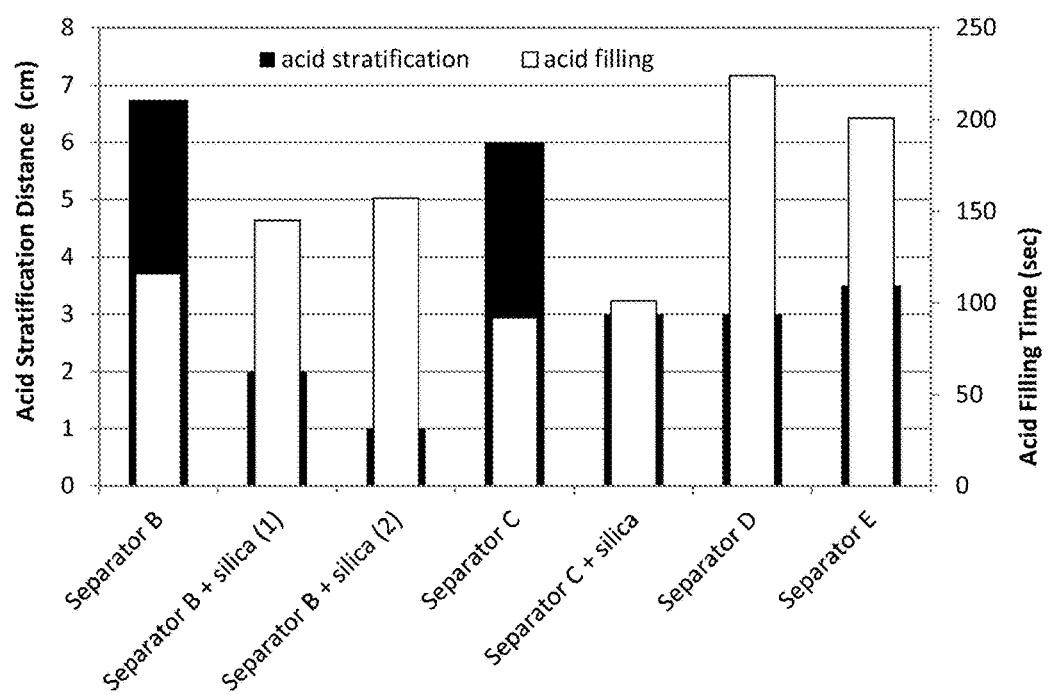
FIG. 8 is a plot of acid stratification distance and acid filling time for the exemplary battery separators in FIG. 7, according to one set of embodiments.

FIG. 8 plots the acid stratification distance and acid filling times for the separators shown in FIG. 7. The testing apparatuses for measuring acid filling time and acid stratification distance are shown in FIG. 3A and FIG. 3B, respectively. It can be seen that the separator B including silica and separator C including silica had significantly reduced acid stratification distances compared to all other separators. In fact, the acid stratification distance for separator B with silica (2) dropped by 3 to 6 times compared to separator B without silica; for separator C with silica, the acid stratification distance dropped by 2 times compared to separator C without silica.

While filling silica into separators B and C significantly reduced the acid stratification distance as noted above, the presence of silica in the separators only slightly increased the acid filling time as compared to separators B and C without silica. Separators B and C with silica had comparable or reduced acid stratification distances and faster acid filling times compared to separators D and E.

In summary, separators including glass fibers having an average fiber diameter of larger than 2 microns and including silica particles had reduced acid stratification distances and relatively low (faster) acid filling times compared to separators without silica particles and/or separators having a lower average fiber size (and/or lower largest and median pore sizes).

What is claimed is:

1. A battery separator, comprising:
a non-woven web comprising:
a plurality of glass fibers having an average diameter of greater than or equal to about 1.5 microns, wherein the glass fibers are present in an amount of greater than or equal to about 50 wt % of the non-woven web; and
a plurality of inorganic particles,
wherein the non-woven web has a largest pore size of at least about 8 microns and less than or equal to about 25 microns, and
wherein the non-woven web has a median pore size of at least about 2.5 microns and less than or equal to about 6 microns.

2. A battery separator, comprising:
a non-woven web comprising:
a plurality of glass fibers having an average diameter of greater than or equal to about 1.5 microns, wherein the glass fibers are present in an amount of greater than or equal to about 50 wt % of the non-woven web;
a plurality of inorganic particles;
wherein the non-woven web has an acid stratification distance of less than or equal to about 5 cm; and
wherein the non-woven web has an acid filling time of less than or equal to about 200 seconds.

3. A battery separator as in claim 1, wherein the inorganic particles are present in an amount of greater than about or equal to about 3 wt % and less than or equal to about 30 wt % of the non-woven web.

4. A battery separator as in claim 1, wherein the plurality of inorganic particles comprise silica.

5. A battery separator as in claim 1, wherein the plurality of inorganic particles comprise precipitated silica.

6. A battery separator as in claim 1, wherein the plurality of inorganic particles have an average specific surface area of greater than or equal to about 100 $m^2/g$ and less than or equal to about 850 $m^2/g$.

7. A battery separator as in claim 1, wherein the plurality of inorganic particles have an average particle size of greater than or equal to about 0.01 micron and less than or equal to about 20 microns.

8. A battery separator as in claim 1, wherein the plurality of glass fibers have an average diameter of greater than or equal to about 2 microns.

9. A battery separator as in claim 1, wherein the glass fibers are present in an amount of greater than or equal to about 50 wt % and less than or equal to about 97 wt % of the non-woven web.

10. A battery separator as in claim 1, wherein the non-woven web further comprises a plurality of synthetic fibers, wherein the synthetic fibers are present in the non-woven web in an amount of greater than or equal to about 0 wt % and less than or equal to about 20 wt %.

11. A battery separator as in claim 10, wherein the plurality of synthetic fibers comprises bi-component fibers.

12. A battery separator as in claim 1, wherein the non-woven web has an acid stratification distance of less than or equal to about 5 cm.

13. A battery separator as in claim 1, wherein the non-woven web has an acid absorption at least 7 g acid/g non-woven web and less than or equal to 10 g acid/g non-woven web.

14. A battery separator as in claim 1, wherein the non-woven web has an acid filling time of less than or equal to about 150 seconds.

15. A battery separator as in claim 1, wherein the non-woven web has a thickness of at least about 0.05 mm and less than or equal to about 5 mm.

16. A battery separator as in claim 1, wherein the non-woven web has an density of least about 100 g/m²/mm and less than or equal to about 250 g/m²/mm.

17. A battery separator as in claim 1, wherein the non-woven web has an overall specific surface area of at least about 1 m²/g and less than or equal to about 100 m²/g.

18. A battery separator as in claim 1, wherein the non-woven web has a tensile strength in the machine direction of the non-woven web greater than or equal to about 0.2 lbs/in and less than or equal to about 20 lbs/in.

19. A battery separator as in claim 1, wherein the non-woven web has a puncture strength of at least about 1 N and less than or equal to about 20 N.

20. A battery separator as in claim 1, wherein the non-woven web has a pressure loss of at least about 15% and less than or equal to about 30%.

21. A battery separator as in claim 1, wherein the non-woven web has a percent thickness loss at 10 kPa of less than or equal to 30%.

22. A battery separator as in claim 1, wherein the non-woven web has a percent thickness loss at 50 kPa of less than or equal to 7.8%.

23. A battery separator as in claim 1, wherein the plurality of particles have an acid weight loss of less than 20%.

24. A battery separator as in claim 1, wherein the non-woven web has a largest pore size of at least about 8 microns and less than or equal to about 18 microns.

25. A battery separator as in claim 1, wherein the non-woven web has a median pore size of at least about 2.5 microns and less than or equal to about 4.5 microns.

26. A lead acid battery comprising the battery separator of claim 1.

* * * * *